United States Patent
Zhao et al.

(10) Patent No.: US 10,159,061 B2
(45) Date of Patent: Dec. 18, 2018

(54) RESOURCE SELECTION FOR DEVICE TO DEVICE DISCOVERY OR COMMUNICATION

(71) Applicant: INTERDIGITAL PATENT HOLDINGS, INC., Wilmington, DE (US)

(72) Inventors: Yuxin Zhao, Linköping (SE); Diana Pani, Montréal (CA); Ghyslain Pelletier, Montréal (CA); Paul Marinier, Brossard (CA); Benoit Pelletier, Roxboro (CA); Samian Kaur, Plymouth Meeting, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/618,997

(22) Filed: Jun. 9, 2017

(65) Prior Publication Data
US 2017/0280423 A1    Sep. 28, 2017

Related U.S. Application Data

(63) Continuation of application No. 14/609,188, filed on Jan. 29, 2015, now Pat. No. 9,693,338.
(Continued)

(51) Int. Cl.
*H04W 72/04* (2009.01)
*H04W 8/00* (2009.01)
(Continued)

(52) U.S. Cl.
CPC ........... *H04W 72/04* (2013.01); *H04W 8/005* (2013.01); *H04W 72/082* (2013.01);
(Continued)

(58) Field of Classification Search
CPC ... H04W 72/02; H04W 72/04; H04W 72/082; H04W 8/005; H04W 76/14; H04W 88/04
See application file for complete search history.

(56) References Cited

U.S. PATENT DOCUMENTS 9,113,450 B2  8/2015  Pelletier et al.
2006/0036518 A1*  2/2006  O'Neill ............... G06Q 20/102
                                                          705/30
(Continued)

FOREIGN PATENT DOCUMENTS

EP        3120641 A1       1/2017
JP       2014-007745 A     1/2014
(Continued)

OTHER PUBLICATIONS

3rd Generation Partnership Project (3GPP), R1-092468, "Control Channel of Backhaul Link", ZTE, TSG-RAN WG1 #57bis, Los Angeles, US, Jun. 29-Jul. 3, 2009, 7 pages.
(Continued)

*Primary Examiner* — Kevin D Mew
(74) *Attorney, Agent, or Firm* — Condo Roccia Koptiw LLP

(57) ABSTRACT

A wireless transmit receive unit (WTRU) may perform provide a report to a network. The WTRU may include a processor that is configured to receive a measurement configuration from the network, where the measurement configuration indicates a threshold and a resource pool on which to perform measurements. The resources pool may be used for communication between one or more mobile device. The processor may be configured to perform measurements on the resource pool and determine whether an energy level for the resource pool is above the threshold for a duration of time. The processor may also be configured to send a report to the network indicating that the energy level for the resource pool is above the threshold for the predetermined duration of time.

16 Claims, 14 Drawing Sheets

Related U.S. Application Data

(60) Provisional application No. 62/075,768, filed on Nov. 5, 2014, provisional application No. 61/990,046, filed on May 7, 2014, provisional application No. 61/955,746, filed on Mar. 19, 2014, provisional application No. 61/933,238, filed on Jan. 29, 2014.

(51) Int. Cl.
  *H04W 72/08* (2009.01)
  *H04W 88/04* (2009.01)
  *H04W 72/02* (2009.01)
  *H04W 76/14* (2018.01)

(52) U.S. Cl.
  CPC ............ *H04W 72/02* (2013.01); *H04W 76/14* (2018.02); *H04W 88/04* (2013.01)

(56) References Cited

U.S. PATENT DOCUMENTS

| | | | |
|---|---|---|---|
| 2009/0291692 A1* | 11/2009 | Kazmi | H04W 16/04 455/452.2 |
| 2010/0027507 A1 | 2/2010 | Li et al. | |
| 2010/0172311 A1 | 7/2010 | Agrawal et al. | |
| 2010/0202400 A1 | 8/2010 | Richardson et al. | |
| 2010/0240312 A1 | 9/2010 | Peng et al. | |
| 2010/0278132 A1 | 11/2010 | Palanki et al. | |
| 2010/0317291 A1 | 12/2010 | Richardson | |
| 2011/0007657 A1 | 1/2011 | Kazmi et al. | |
| 2011/0106952 A1* | 5/2011 | Doppler | H04W 72/0406 709/226 |
| 2011/0122933 A1 | 5/2011 | Adam et al. | |
| 2012/0076084 A1 | 3/2012 | Iwamura et al. | |
| 2013/0064187 A1 | 3/2013 | Patil et al. | |
| 2013/0100846 A1* | 4/2013 | Park | H04W 24/10 370/252 |
| 2013/0107704 A1 | 5/2013 | Dinan | |
| 2013/0109301 A1* | 5/2013 | Hakola | H04W 76/14 455/39 |
| 2013/0208604 A1* | 8/2013 | Lee | H04L 25/0226 370/252 |
| 2013/0210435 A1* | 8/2013 | Dimou | H04W 36/0083 455/436 |
| 2013/0242787 A1* | 9/2013 | Sun | H04W 24/10 370/252 |
| 2013/0244709 A1* | 9/2013 | Davydov | H04W 72/0413 455/501 |
| 2013/0267230 A1* | 10/2013 | Lin | H04W 24/10 455/436 |
| 2013/0272262 A1* | 10/2013 | Li | H04W 28/02 370/330 |
| 2013/0288737 A1* | 10/2013 | Nentwig | H04W 52/243 455/522 |
| 2013/0322413 A1 | 12/2013 | Pelletier et al. | |
| 2013/0343291 A1 | 12/2013 | Gao et al. | |
| 2014/0119228 A1* | 5/2014 | Wang | H04W 24/10 370/252 |
| 2014/0128057 A1* | 5/2014 | Siomina | H04J 3/0685 455/423 |
| 2014/0204825 A1 | 7/2014 | Ekpenyong et al. | |
| 2014/0241260 A1* | 8/2014 | Schmidt | H04W 72/04 370/329 |
| 2014/0256329 A1 | 9/2014 | Cao et al. | |
| 2014/0314000 A1* | 10/2014 | Liu | H04W 72/042 370/329 |
| 2014/0334391 A1* | 11/2014 | Khoshnevis | H04W 72/0413 370/329 |
| 2015/0029983 A1 | 1/2015 | Kimoto | |
| 2015/0271841 A1 | 9/2015 | Yamada et al. | |
| 2015/0327240 A1 | 11/2015 | Yamada et al. | |
| 2016/0057604 A1 | 2/2016 | Luo et al. | |
| 2016/0135200 A1 | 5/2016 | Brahmi et al. | |
| 2016/0165428 A1 | 6/2016 | Lee et al. | |
| 2016/0309355 A1* | 10/2016 | Seo | H04W 8/005 |
| 2017/0013595 A1 | 1/2017 | Jung et al. | |
| 2017/0142741 A1 | 5/2017 | Kaur et al. | |

FOREIGN PATENT DOCUMENTS

| | | |
|---|---|---|
| RU | 2503153 C2 | 12/2013 |
| WO | WO 2011/069295 A1 | 6/2011 |
| WO | WO 2013/123637 A1 | 8/2013 |
| WO | WO 2014/169695 A1 | 10/2014 |

OTHER PUBLICATIONS

3rd Generation Partnership Project (3GPP), R1-092965, "Control Structure for Relay Type 1 Nodes", NEC Group, TSG-RAN WG1#57Bis, Los Angeles, CA, US, Jun. 29-Jul. 3, 2009, 5 pages.
3rd Generation Partnership Project (3GPP), R1-135142, "RRM for D2D Communication", Fujitsu, 3GPP TSG-RAN1 #75, San Francisco, United States, Nov. 11-15, 2013, 6 pages.
3rd Generation Partnership Project (3GPP), R1-135316, "Multi-Hop D2D Synchronization Performance", Qualcomm Incorporated, 3GPP TSG-RAN WG1 #75, San Francisco, USA, Nov. 11-15, 2013, 7 pages.
3rd Generation Partnership Project (3GPP), R1-135803, "Synchronization Procedures for D2D Discovery and Communication", Ericsson, 3GPP TSG RAN WG1 Meeting #75, San Francisco, USA, Nov. 11-15, 2013, 6 pages.
3rd Generation Partnership Project (3GPP), R1-140773, "Synchronization Procedures for D2D Discovery and Communication", Ericsson, 3GPP TSG RAN WG1 Meeting #76, Prague, Czech Republic, Feb. 10-14, 2014, 7 pages.
3rd Generation Partnership Project (3GPP), R2-140422, "Procedures for Type 1 and Type 2 Discovery Resource Allocation", Huawei, HiSilicon, 3GPP TSG RAN WG2 Meeting #85, Prague, Czech Republic, Feb. 10-14, 2014, 8 pages.
3rd Generation Partnership Project (3GPP), R2-140714, "Resource Allocation Aspects of 1: M D2D Broadcast Communication", Qualcomm Incorporated, 3GPP TSG-RAN WG2 #85, Prague, Czech Republic, Feb. 10-14, 2014, 4 pages.
3rd Generation Partnership Project (3GPP), TR 36.843 V1.0.0, "Technical Specification Group RAN, Study on LTE Device to Device Proximity Services—Radio Aspects, (Release 12)", Nov. 2013, pp. 1-32.
Wiemann et al., "Status Report RAN WG2 to TSG-RAN #63", 3GPP TSG RAN-63, Fukuoka, Japan, Mar. 3-6, 2014, 40 pages.
$3^{rd}$ Generation Partnership Project (3GPP), R2-122185, "Early Termination of T310", Qualcomm Incorporated, 3GPP TSG-RAN WG2 Meeting #78, Prague, Czech Republic, May 21-25, 2012, 4 pages.
$3^{rd}$ Generation Partnership Project (3GPP), R2142230, "Mode-1 in Coverage Exception Handling", Huawei, HiSilicon, 3GPP TSG RAN WG2 Meeting #86, Seoul, Korea, May 19-23, 2014, 7 pages.
$3^{rd}$ Generation Partnership Project (3GPP), Tdoc R2-142685, "Mode Selection for D2D Communications", InterDigital Communications, 3GPP TSG-RAN WG2 #86, Seoul, Korea, May 19-24, 2014, 5 pages.
$3^{rd}$ Generation Partnership Project (3GPP), R3-140047, "Discussion on the Coordination of D2D Resource for Inter-Cell D2D Discovery and Communication", ZTE, 3GPP TSG-RAN WG3 Meeting #83, Feb. 10-14, 2014, 6 pages.
3rd Generation Partnership Project (3GPP), R1-135998, Cover sheet for TR 36.843 V1.0.0 on "Study of LTE Device to Device Proximity Services-Radio Aspects", Qualcomm Incorporated (Rapporteur), 3GPP TSG-RAN WG1, Meeting #75, San Francisco, USA, Nov. 11-15, 2013, 1-33 pages.

* cited by examiner

RESOURCE SELECTION FOR DEVICE TO DEVICE DISCOVERY OR COMMUNICATION

CROSS-REFERENCE TO RELATED APPLICATIONS

This application is a continuation of U.S. application Ser. No. 14/609,188, filed Jan. 29, 2015, which claims the benefit of U.S. Provisional Application No. 61/933,238, filed Jan. 29, 2014, U.S. Provisional Application No. 61/955,746, filed Mar. 19, 2014, U.S. Provisional Application No. 61/990,046, filed May 7, 2014, and U.S. Provisional Application No. 62/075,768, filed Nov. 5, 2014, the disclosures of which are incorporated herein by reference in their entirety.

BACKGROUND

The proximity between devices may be determined using LTE positioning. In Device-to-Device (D2D) neighbor discovery, two or more devices may determine their relative proximity based on direct radio communications. Additional interference may be introduced by these D2D transmissions.

SUMMARY

Systems, methods, and instrumentalities are disclosed to manage potential interference that may be caused by D2D communications. A first WTRU may send a resource report to a network. The first WTRU may receive one or more resources from the network for transmission of a discovery signal. The first WTRU may send the discovery signal to a second WTRU.

The resource report may include one or more of resources for transmission for D2D communication, identity of a discovery process, location information, outcome of a discovery process, outcome of a transmission attempt, measured resource utilization, network resource configuration information, and/or a number of failures or successes on a resource.

The resource report may be sent by the first WTRU based on a configuration of a WTRU (e.g., the first WTRU and/or the second WTRU), a periodic schedule, an aperiodic schedule, a change in operation status, an outcome of a discovery process, an outcome of a discovery signal decoded by the second WTRU, and/or an outcome of a transmission attempt by the first WTRU.

The one or more resources may be characterized by one or more of timing information, frequency information, sequence information, and a hopping pattern.

The first WTRU and the second WTRU may be served by the same network element (e.g., eNB). The first WTRU may be served by a first eNB and the second WTRU may be served by a second eNB. The first WTRU may be served by an eNB and the second WTRU may be out-of-coverage of the network. The first WTRU may be out-of-coverage of the network and the second WTRU may be served by an eNB.

A wireless transmit receive unit (WTRU) may include a processor. The processor may be configured to perform one or more of the following. The processor may determine to send information using a device-to-device transmission via a resource pool from a plurality of resource pools. Each resource pool may be associated with a range of reference signal receive power (RSRP) values. The processor may determine a RSRP measurement of a cell associated with the WTRU. The processor may select a resource pool from the plurality of resource pools based on the RSRP measurement of the cell. The RSRP measurement of the cell may be within the range of RSRP values associated with the selected resource pool. The processor may send the information using the selected resource pool.

The range of RRSP values associated with the selected resource pool may include a low RSRP threshold and a high RSRP threshold. The RSRP measurement of the cell may be between the low RSRP threshold and the high RSRP threshold.

The processor may be further configured to select a resource from a plurality of resources in the selected resource pool. The processor may be configured to select the resource using a randomization function or a pseudo-random function. The processor may be configured to send the information on the selected resource. The selected resource may include one or more subframes. The selected resource may include one or more physical resource blocks (PRBs).

The processor may be further configured to receive a configuration via radio resource control (RRC) signaling and determine, based on the configuration, that the selection of the resource pool is based on RSRP. The configuration may identify the resource pool and the range of RSRP values associated with the resource pool.

A method (e.g., a computer-implemented method) may include determining (e.g., at a processor) to send information using a device-to-device transmission via a resource pool from a plurality of resource pools. Each resource pool may be associated with a range of reference signal receive power (RSRP) values. The method may include determining (e.g., via a processor) a RSRP measurement of a cell associated with the WTRU. The method may include selecting (e.g., by a processor) a resource pool from the plurality of resource pools based on the RSRP measurement of the cell. The RSRP measurement of the cell may be within the range of RSRP values associated with the selected resource pool. The method may include sending (e.g., via a transmitter) the information using the selected resource pool.

The range of RRSP values associated with the selected resource pool may include a low RSRP threshold and a high RSRP threshold. The RSRP measurement may be between the low RSRP threshold and the high RSRP threshold.

The method may include selecting a resource from a plurality of resources in the selected resource pool. The method may include selecting the resource using a randomization function or a pseudo-random function. The method may include sending the information on the selected resource.

The method may include determining that the device-to-device transmission is a Type 1 device-to-device transmission. The Type 1 device-to-device transmission may be characterized by a WTRU selecting the resource pool from the plurality of resource pools. The Type 1 device-to-device transmission may be characterized by a WTRU selecting a resource from a plurality of resources in the selected resource pool. The method may include receiving a request to send the information using the device-to-device transmission and determining to send the information using the device-to-device transmission in response to the request.

A wireless transmit receive unit (WTRU) may include a processor. The processor may be configured for one or more of the following. The processor may receive a device-to-device transmission request to send information via a resource pool from a plurality of resource pools. The processor may determine that selection of the resource pool from the plurality of resource pools is based on reference signal receive power (RSRP). The processor may receive a RSRP threshold associated with at least one resource pool from the plurality of resource pools. The processor may determine a RSRP measurement of a base station. The processor may compare the RSRP measurement of the base station with the RSRP threshold associated with the at least one resource pool. The processor may select the at least one resource pool to send the information via device-to-device transmission when the RSRP measurement of the base station is above the RSRP threshold. The processor may send the information using the at least one resource pool when the at least one resource pool is selected to send the information.

The selected resource pool may include a plurality of resources. The processor may select a resource from the plurality of resources based on a randomization function and send the information using the selected resource. The resource may include a subframe or a physical resource block (PRB). The processor may receive a system information block (SIB) that identifies the at least one resource pool and indicates the RSRP threshold associated with the at least one resource pool. The RSRP threshold may be a low RSRP threshold of an open-ended range of RSRP values or a high RSRP threshold of the open-ended range of RSRP values.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
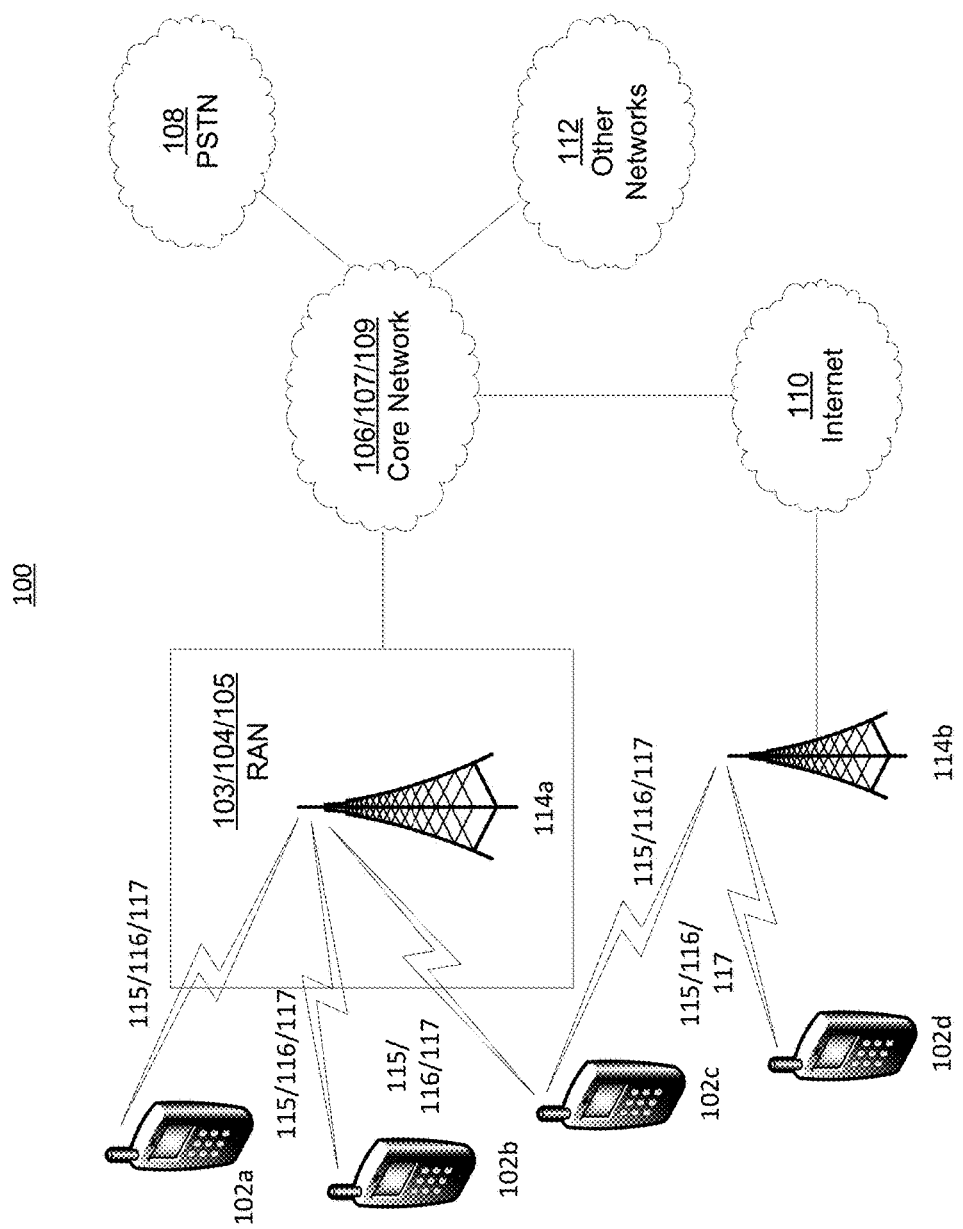
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
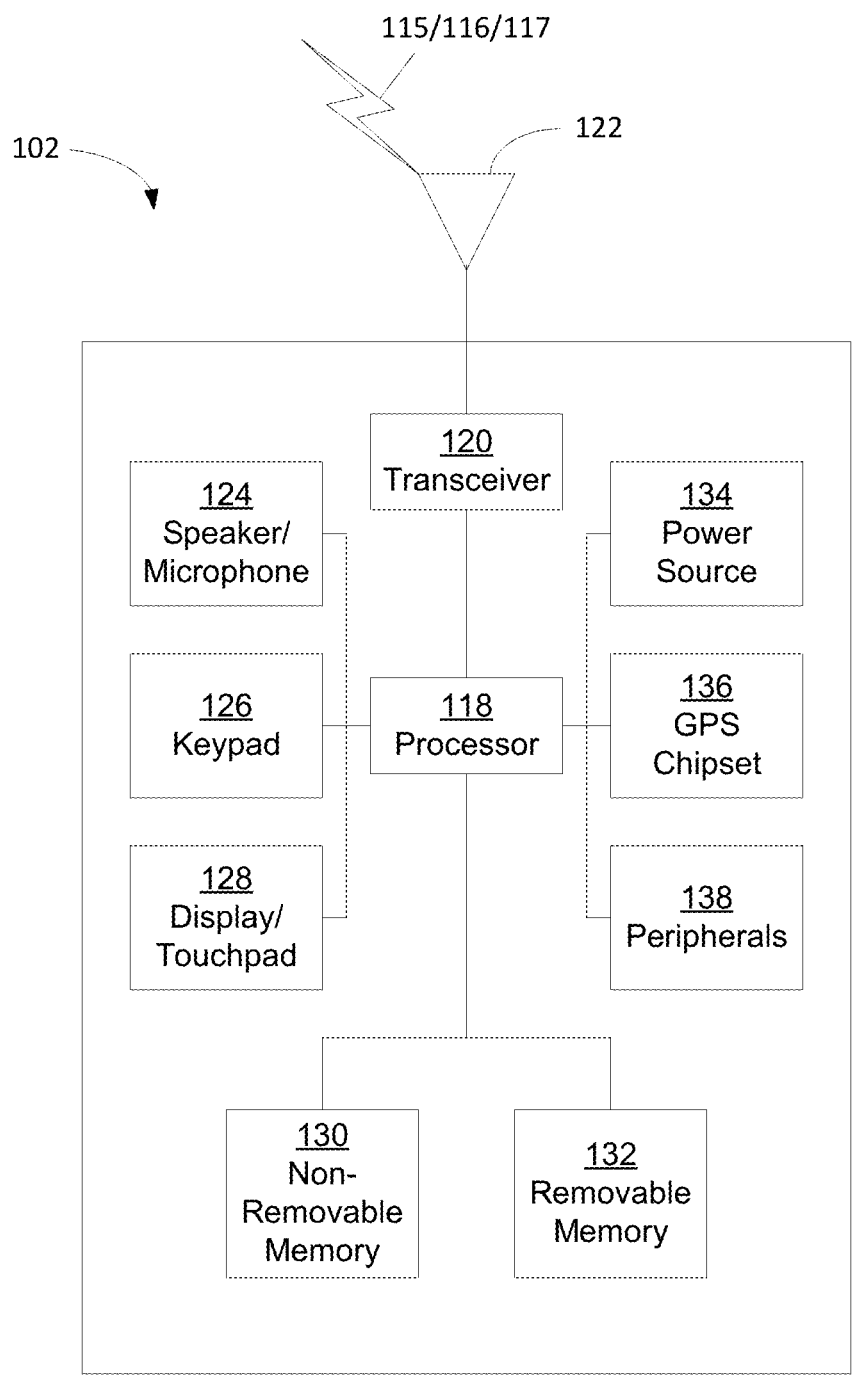
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
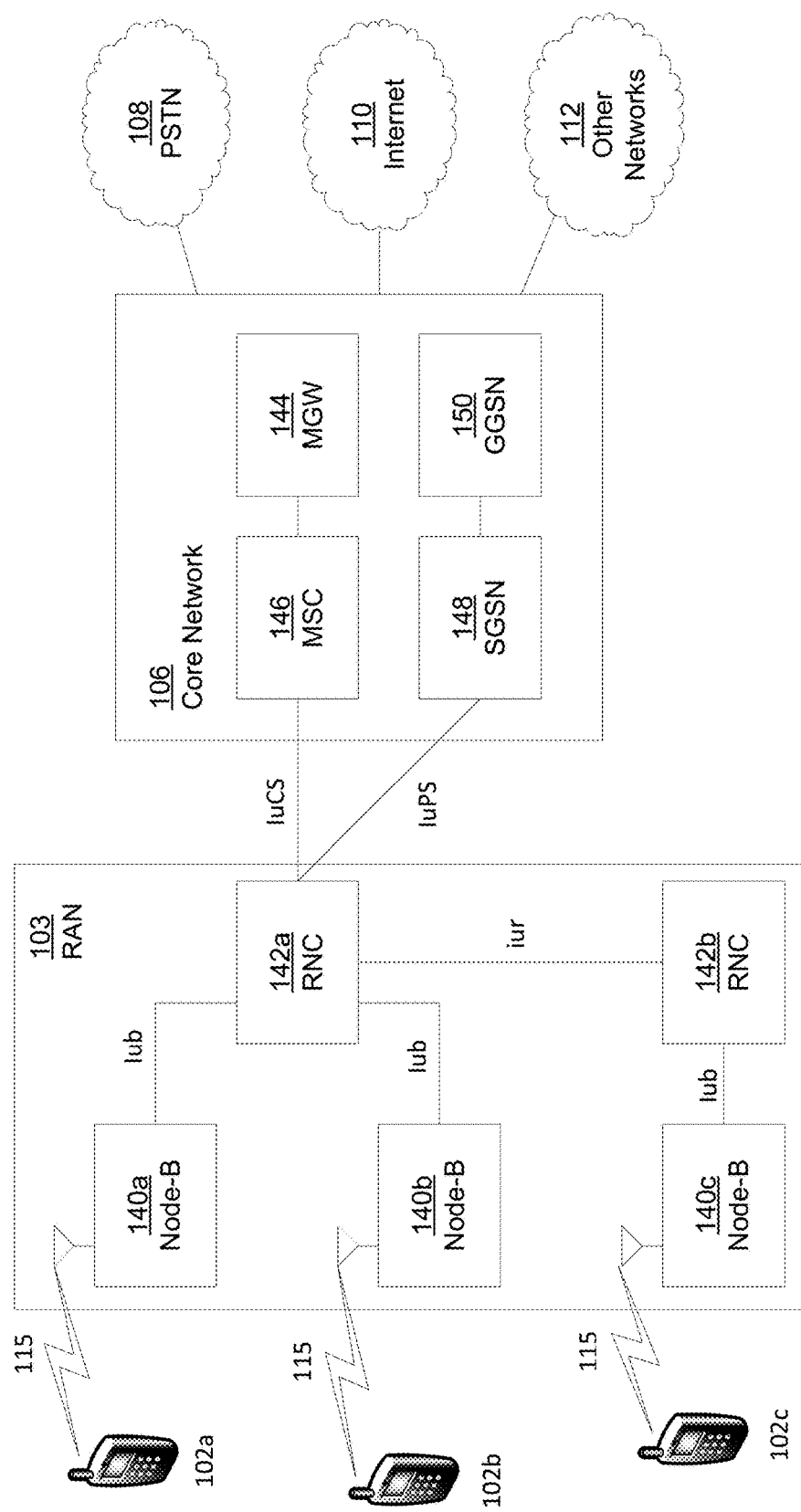
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
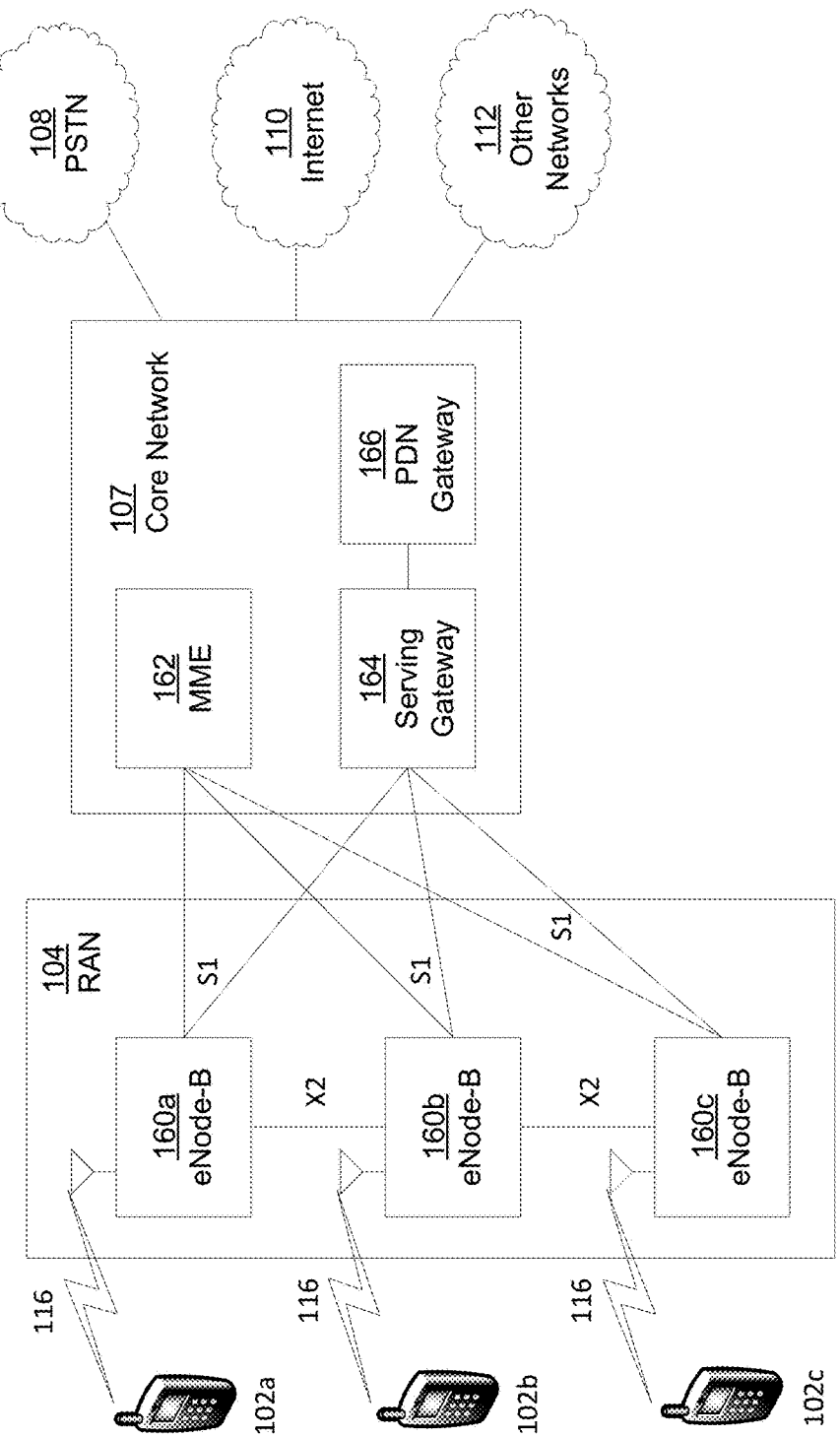
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
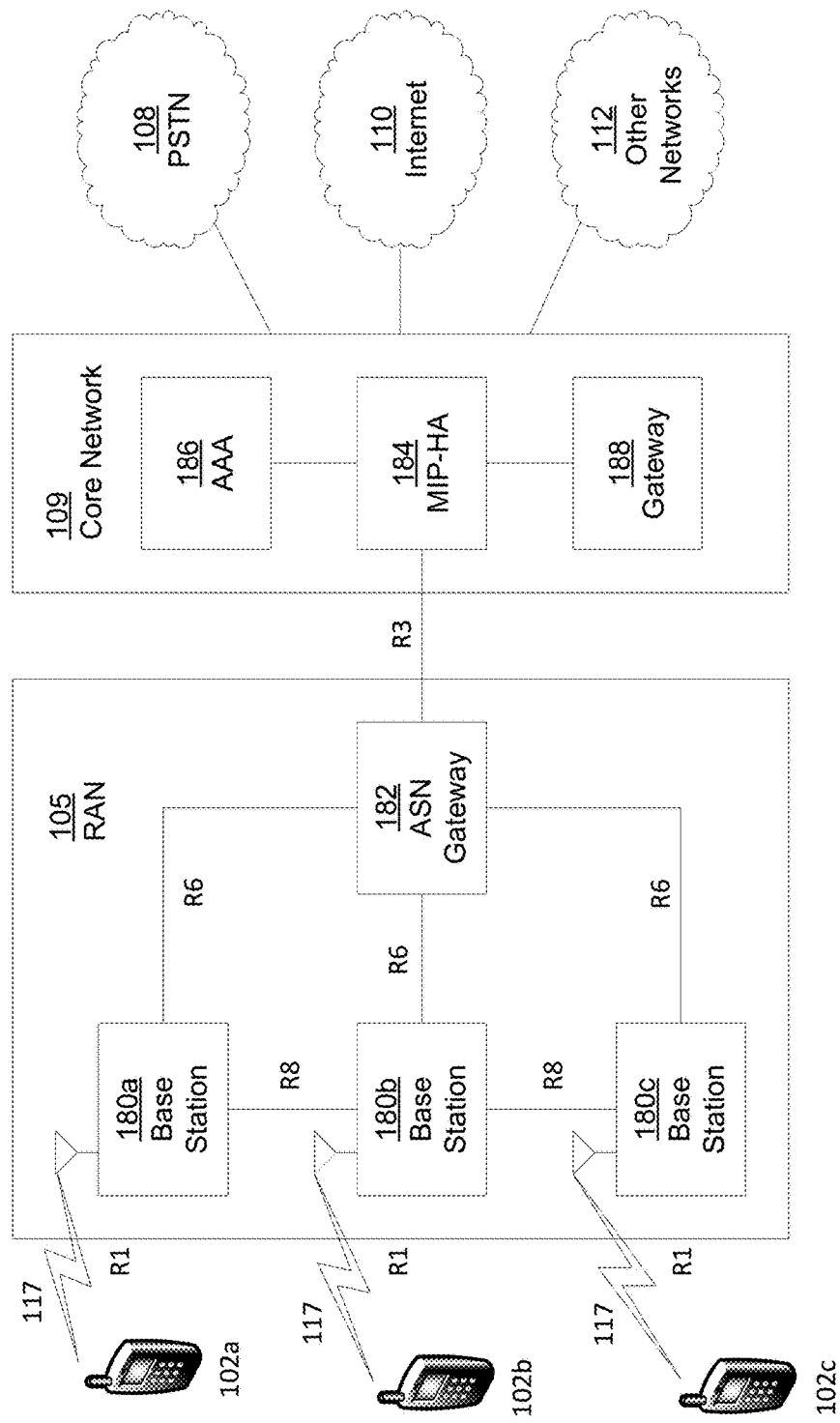
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

Figure 2:
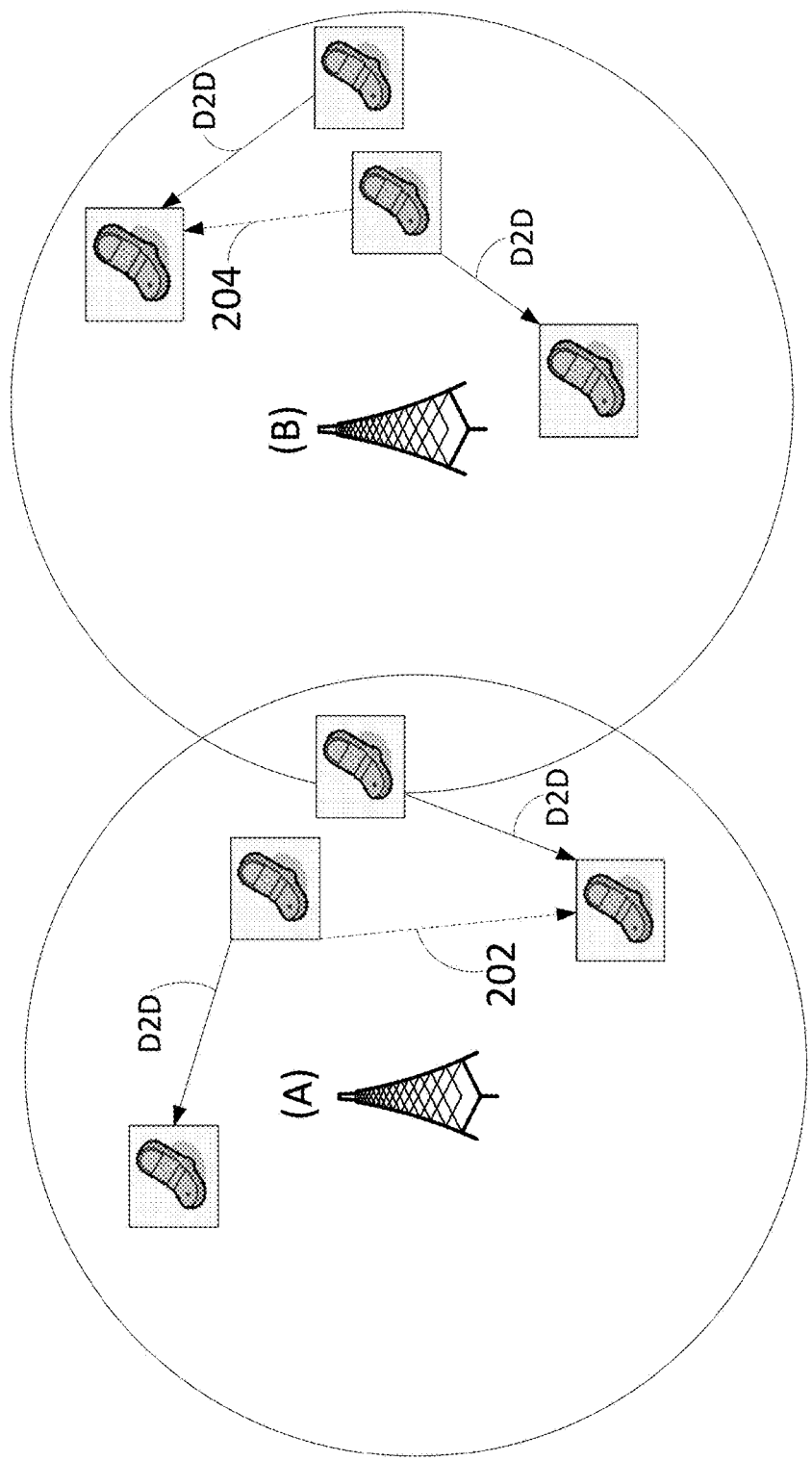
FIG. 2 is a diagram of an example of intra-cell interference between D2D links.

FIG. 2 is a diagram of an example of intra-cell interference between D2D links. When two or more D2D transmitting WTRUs in the same cell transmit signals (e.g., discovery signals) on the same resource, interference 202, 204 may be introduced to the D2D transmission in the cell.

Figure 3:
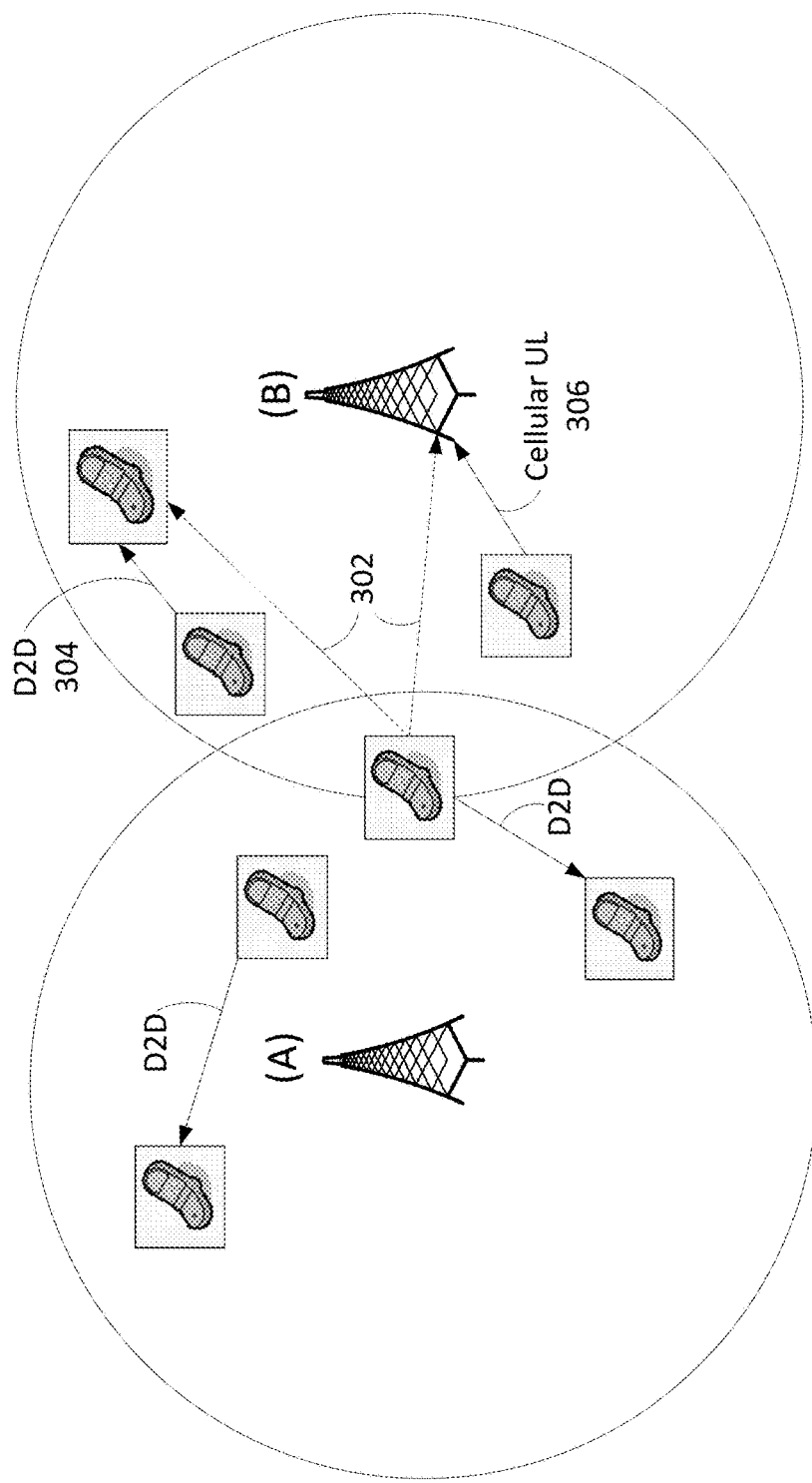
FIG. 3 is a diagram of an example of inter-cell interference between D2D links and from a D2D link to a cellular link.

FIG. 3 is a diagram of an example of inter-cell interference between D2D links and from a D2D link to a cellular link. When a cell edge D2D transmitting WTRU transmits a signal (e.g., a discovery signal) using the same resources as one or more transmitting WTRUs (e.g., a WTRU transmitting a D2D signal, a cellular signal (e.g., such as an UL PUSCH), and/or the like in a neighbor cell, interference 302 may be introduced to a signal, such as a D2D signal 304 and/or a PUSCH transmission 306, in a neighbor cell.

Figure 4:
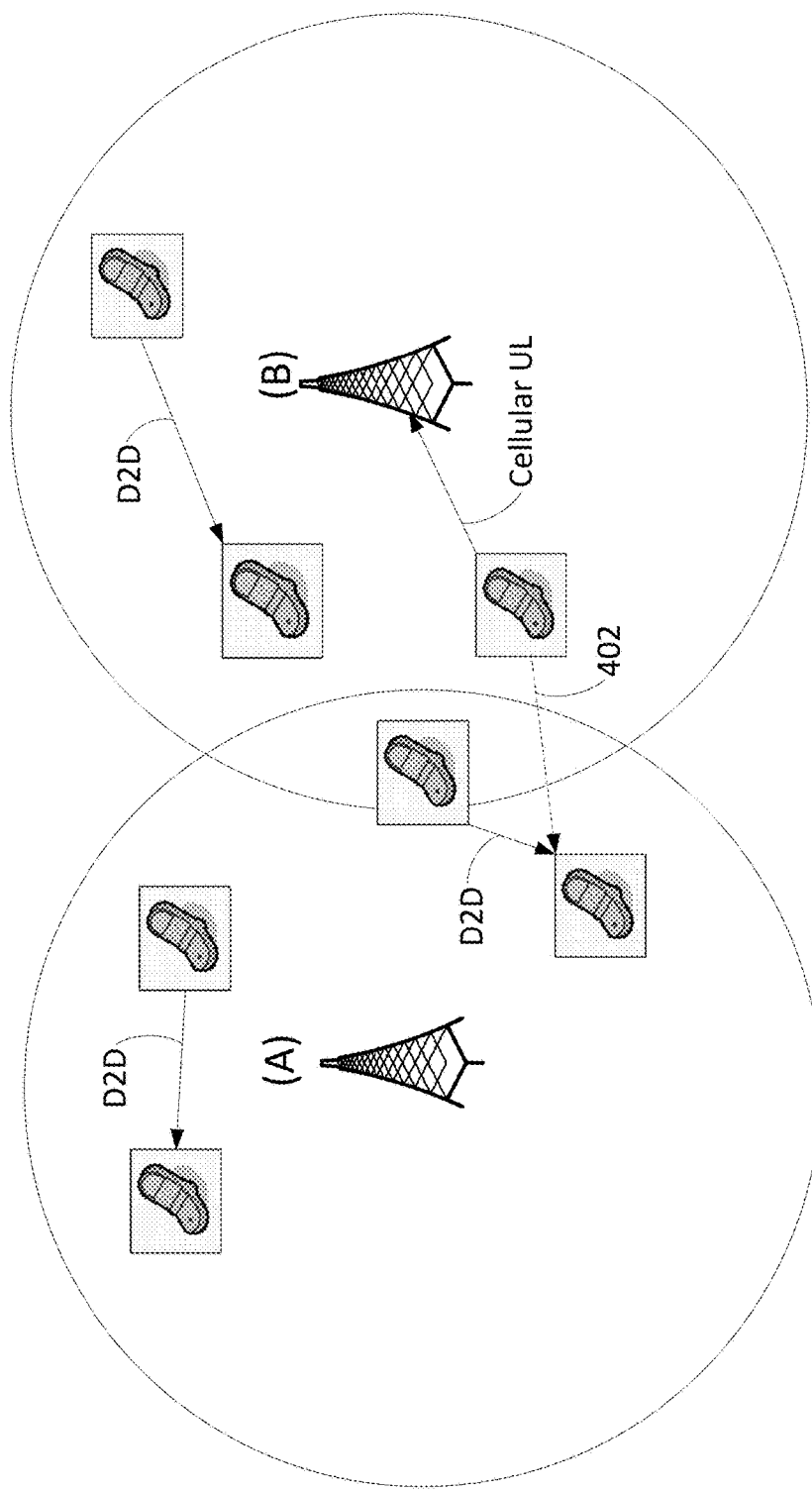
FIG. 4 is a diagram of an example of intra-cell interference from a cellular link to D2D links.

FIG. 4 is a diagram of an example of intra-cell interference from a cellular link to one or more D2D links. When a cell edge cellular transmitting WTRU transmits a signal (e.g., an UL PUSCH transmission) using the same resources as a D2D transmitting WTRU in a neighbor cell, interference 402 may be introduced to D2D transmissions in the neighbor cell.

The interference between cellular UL transmission and D2D links may be avoided by dedicating a number of subframes to D2D. The interference between D2D links within the same cell as well as cross neighbor cells may be managed.

Interference may be managed by means of resource allocation. For example, by allocating resources properly, the probability that two or more D2D WTRUs select the same resource may be reduced. For example, the network may determine the amount of resources to allocate to two or more D2D transmitting WTRUs. For example, the network may determine which resources to allocate to which WTRU. For example, D2D WTRU may select the resources to transmit a discovery signal.

Figure 5:
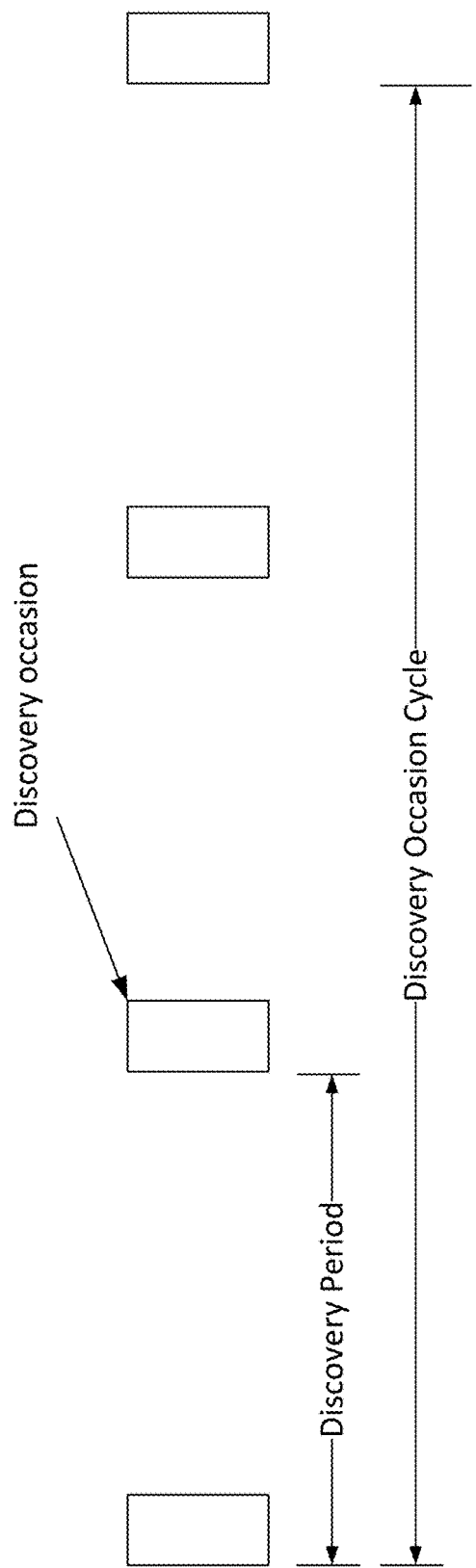
FIG. 5 is a diagram of an example of a discovery occasion.

FIG. 5 is a diagram illustrating an example of a discovery occasion. A discovery occasion may refer to a number of consecutive subframes that may be reserved in a discovery period. The discovery occasion may be used for discovery. The discovery period may refer to a period of time between the start of two consecutive discovery occasions. For example, the discovery period may be t seconds. The discovery occasion cycle may refer to a set of $N_{do}>1$ consecutive discovery occasions.

Network may refer to a node (e.g., any node) that is involved in the control of the allocation of resources for a discovery signal transmission. For example, the network may refer to an eNB, a ProSe server, mobile device that may act as a centralized coordinating entity for the D2D discovery function, and/or the like. One or more embodiments provided herein may be provided in the context of discovery. One or more embodiments provided herein may apply to a direct device-to-device (D2D) communication. One or more embodiments provided herein may be applicable to the data part of a D2D communication. One or more embodiments provided herein may be applicable to the control part of a D2D communication (e.g., the SA, D2DSS, or other control signal). For example, one or more embodiments provided herein may be applicable to Sidelink Control Information (SCI) that may be carried on the Physical Sidelink Control Channel (PSCCH) or to Sidelink Synchronization Signals that may be carried on the Physical Sidelink Broadcast Channel (PSBCH).

A transmitter WTRU may transmit a Scheduling Assignment (SA) that may indicate, for example, resources (e.g., time and frequency, for example subframe(s) and/or PRB(s)) used for transmission of D2D data to a receiver WTRU, such as when WTRUs may be performing D2D communications. For example, a transmitter WTRU may transmit D2D data in resources that may be indicated by a Scheduling Assignment. A receiving WTRU may determine resources (e.g., time and frequency) to receive data based on, for example, the reception of a Scheduling Assignment.

A D2DSS may be a device-to-device synchronization signal.

A WTRU may be configured with one or more independent discovery processes. For example, a discovery process may be tied to a specific application and/or may correspond to a specific discovery signal that the WTRU transmits and/or receives. Examples provided herein may be discovery process-specific and/or be applicable to all discovery processes, e.g., at once. A WTRU may be configured with one or more D2D communications processes. One or more embodiments described herein may be applicable on a per-D2D communication process basis. One or more embodiments described herein may be applicable to a plurality of (e.g., all) D2D communications processes, for example, at once. One or more embodiments described herein may be applicable to certain D2D modes of operation (e.g., Mode 1—eNB-controlled, Mode 2—distributed, etc.) and/or to certain D2D coverage states (e.g., in-coverage, edge-of-coverage, out-of-coverage).

A discovery signal may correspond to a D2D message that carries information pertaining to, for example, a discovery process (e.g., proximity, discovery identities). A D2D message may carry, for example, a data part of D2D communications. A D2D message may carry, for example, Scheduling Assignment information that may be used to perform a function (e.g., scheduling the data part of D2D communications).

One or more embodiments described herein in the context of discovery signals may be applicable to any D2D transmissions and/or messages. Discovery signal, discovery signal resource, measurements, etc. may be used interchangeably and/or applied to a D2D message, D2D resources, or measurement.

One or more embodiments for resource allocation may be provided. A WTRU may be allocated one or more resources for the transmission of a discovery signal. A WTRU may be allocated one or more resources for D2D transmissions (e.g., SA and/or data transmissions). A WTRU may select one or more resources for D2D transmissions (e.g., SA and/or data transmissions). Resource allocation may be characterized by timing information (e.g. when is the resource available, at the granularity of one transmission time interval (TTI) and/or subframe), by frequency (e.g. carrier, set of PRBs (physical resource blocks), and/or the like), by information (e.g. where in frequency is the resource located, e.g. for one or more subframes), by parameters that may determine how the signal is transmitted and/or received (e.g. sequence, hopping pattern, and/or the like), and/or the like. Timing information may include absolute timing information, periodic allocation information, timing information relative to another aspect of the discovery configuration and/or process, and/or the like. Information relating to resource allocation may be signaled (e.g., explicitly signaled) and/or parameterized, for example, such that the WTRU may implicitly calculate and/or determine the resource allocation (e.g., in time and/or in frequency) and/or the WTRU may be tabulated such that indices to one or more entries in a table(s) may be exchanged.

The resource allocation may be structured, for example, such that it may be represented as an indexed list of elements, for example, where each element may correspond to a specific resource. For example, a WTRU may be configured with a configuration index which may represent one of a number X possible configurations for the specific applicable frame structure (e.g., FDD or TDD when under network coverage, a frame structure specific to a direct WTRU-to-WTRU communication, and/or discovery operation). The configuration index may refer to a tabulated value which may be used by the WTRU to determine the set of resources available (e.g., in the cell). The WTRU may use this information to determine the indexing of the resources.

The WTRU may be configured with a frequency offset (e.g., if the resources span a subset of all the physical resource blocks (PRBs) in a given subframe). The frequency offset may indicate the first PRB of the resource for a given subframe. For a time interval (e.g., a 10 ms frame, a time period of Y TTIs, Y ms, and/or Y radio frames, etc.), the WTRU may determine what subframe includes a resource and/or the location of the first PRB of the resource. The resource may be indexed for a period (e.g., period Y) in increasing order of the subframe number and/or of the PRB in the frequency domain (e.g., if multiple resources may be multiplexed in frequency for a given subframe). For example, the first resource in a period Y may be allocated index 0, the second resource in the period Y may be allocated index 1, and so on. The WTRU may be allocated resources such that all resources in the set are available and/or such that a subset of resources in the set may be available, for example, by receiving (e.g., as part of the configuration) a masking parameter and/or specific indices that represent the subset of resources within the set of resources.

A resource for SA and/or its associated data transmission may comprise an index to a plurality of frequency and/or PRB elements, for example, in D2D communications. A WTRU may be configured to repeat SA. A SA resource may comprise, for example, an associated transmission pattern indicating information (e.g., frequency and/or time location of a SA over a period of time). A scheduling period may refer to the frequency and/or time location of a SA over a period of time. A resource for data transmission may comprise an associated transmission pattern. Data may not necessarily repeat. Data may comprise transmission opportunities for a WTRU.

For example, a WTRU may be configured with one or more resources for D2D communications. One or more resources for D2D communications may be associated with a mode of operation (e.g., Mode 1, Mode 2, etc.). One or more resources for D2D communications may be associated with a coverage state. For example, a WTRU may be configured to report to an eNB for resources that may be in control of an eNB, e.g., for a resource pool associated to operations (e.g., in-coverage, edge-of-coverage operations).

WTRU measurement and reporting may be provided. The WTRU may perform one or more measurements and report the one or more measurements to the network (e.g., eNB), for example, to help the network determine the amount of resources to allocate to the WTRU.

An availability status of a resource may be determined based on a measured energy level. The measured energy level may be compared with a threshold to determine the availability status of the resource.

A resource may be determined to be occupied and/or unavailable for transmission. For example, a resource may be determined to be occupied and/or unavailable for transmission when a measured energy level on the resource is above a threshold. The resource may be unavailable when a measured energy level on a resource is above a threshold for a predefined period of time. The resource may be unavailable when the WTRU determines that the resource is being used by another WTRU, for example, by means of a received and/or detected announcement message and/or control message, and/or the like.

A resource may be determined to be available for transmission. For example, a resource may be determined to be available for transmission when a measured energy level is below a threshold. The resource may be available when a measured energy level is below a threshold for a predefined period of time. A resource that is available may be used by the WTRU at any time (e.g., if allocated by the network for that WTRU to transmit), and/or the like.

A discovery signal may be determined to be present on a resource. A communication signal may be determined to be present on a resource. For example, a signal (e.g., discovery signal and/or communication signal) may be determined to be present on a resource when a measured energy on the resource is above a defined threshold. For example, the signal may be detected on the resource when a measured energy on the resource is above a threshold for a period of time. The signal may be detected on the resource when a discovery signal is decoded successfully on the resource. The signal may be detected on the resource when a control signal associated with a discovery signal and/or communication signal (e.g., indicating the presence of the discovery signal or communication signal) is decoded successfully, and/or the like.

A WTRU may measure SA utilization by counting SAs (e.g., successfully received SAs) in a time frame. A determination may be made that SA resources have been successfully received, for example, if a WTRU decodes a SA and associated CRC checks. A SA may be considered successfully received if the measured SNR is above a threshold. The threshold may be determined (e.g., by tests, configured, etc.). The WTRU may count SAs when the CRC is masked by an identity that is unknown to a WTRU. An SA resource that is successfully received may be considered utilized.

A WTRU may measure SA utilization by measuring energy in SA resources. An SA resource may be considered utilized, for example, if a WTRU measures the energy level in an SA resource location (e.g., in time/frequency). An SA resource may be considered utilized if a WTRU determines that the energy level in an SA resource is above a threshold. A threshold may be predefined. A threshold may be defined by other parameters (e.g., by tests or configured).

A WTRU may measure near-far effect. A WTRU may determine near-far effect. Near-far effect may impact, for example, the ability of a WTRU to receive communications from other WTRUs (e.g., when the signal strength of a WTRU may be stronger than the signal of other WTRUs, when detection of a low received power signal is more difficult than normal, and/or the like).

A WTRU may suffer from the near-far effect, for example, when a WTRU receives signal from one or more WTRUs with a stronger power than other WTRU signals. A WTRU may be configured to detect examples of near-far effect by measuring the signal power of one or more devices in the vicinity. A WTRU may be configured to detect examples of near-far effect by determining whether one or more signals in the vicinity has the potential to create near-far effect. A WTRU may be configured to detect examples of near-far effect by determining when one or more signals are stronger than other signals by an amount, such as, for example, a predefined amount or threshold.

A WTRU may determine D2D data resources based on, for example, D2D data transmission patterns. A D2D data resource may comprise a predefined pattern (e.g., in time, in frequency, or both). A WTRU may be configured to measure for a D2D data pattern. A WTRU may be configured to measure for an aggregate D2D data pattern (e.g., a WTRU may be configured to report for all PRBs for a specific time-based pattern).

The measure energy level may be weighted (e.g., divided, subtracted in the dB domain, modified, and/or the like) by a thermal noise measurement/estimate performed by the WTRU.

A WTRU may report the resource usage to the network. A WTRU may perform transmissions, such as when a WTRU is configured with resources for transmission (e.g., of a discovery signal, a D2D transmission, or a D2D message). If the resource is dedicated to a WTRU and/or discovery process, the outcome (e.g., of the discovery or D2D transmissions) may be less likely impacted by interference from other transmitting WTRUs. In this case, it may be assumed that there is no other WTRU in proximity of the transmitting WTRU if no other WTRU successfully receive the discovery signal from the transmitting WTRU.

If the resource may be shared by a plurality of transmitting WTRUs (e.g., for the same or for different discovery processes and/or D2D transmissions), the outcome of the discovery may be impacted by interference from other transmitting WTRUs that may contend for the resource and/or that may be within proximity of each other. In such case, it may not be possible to determine whether a monitoring WTRU has not been successful in receiving the discovery signal or D2D message, for example, because the received signal may be too weak (e.g., the monitoring WTRU may not be within proximity of the transmitting WTRU), because the level of interference is too high (e.g. the monitoring WTRU may be within proximity of the transmitting WTRU but the signal may not be detected with sufficient signal to noise ratio), and/or the like. This may be problematic for the network resource management, for example, because there may not be means to determine if more resources are needed for discovery/communications.

Collisions may occur in a resource that is shared by different WTRUs and/or by the discovery processes. The network may allocate one or more resources to a plurality of transmitting WTRUs. A collision may occur for a concerned resource when more than one transmitting WTRUs are transmitting a discovery signal. A collision may occur for a concerned resource when a plurality of transmitting WTRUs are transmitting a D2D message. The level of interference generated may be a function of the distance between the transmitting WTRUs that generate the collision on the concerned resource and/or as a function of the relative distance of a receiving WTRU to such transmitting WTRUs (e.g., when the signal power received from the WTRUs has a ratio that trends towards 1). The network may allocate resources by estimating the rate of discovery events. The network may allocate resources by estimating the rate of D2D transmission events. The network may allocate resources by estimating the rate of transmission by WTRUs sharing the resource. The network may allocate resources by targeting a specific collision rate, for example, such that the network does not over-allocate the resources (e.g., low collision rate, sub-optimal use of resources, etc.) and/or under-allocate the resources (e.g., high collision rate, lower efficiency of the discovery mechanism, etc.).

The network may not determine the proper operating point when allocating resources. For example, the network may not know the frequency of transmission of the discovery signals (e.g., in case of WTRU-autonomous triggers), the number of active transmitting WTRUs (e.g., in case discovery transmission is supported in IDLE mode), the geographical distribution of the WTRUs (e.g., transmitting or receiving) involved in D2D transmissions (e.g., discovery process(es) or data related transmissions, such as SA and/or data) in a given cell for which resources are allocated, and/or the like.

The network may redistribute the load and/or minimize collisions risk. The network may monitor resource usage for a transmission(s) (e.g., D2D transmission, discovery signal, data related transmission, and/or the like) in shared resources, for example, such that the network may re-allocate resources when high collision rates are detected. When the network may determine that collisions are below a certain threshold, the network may determine that the outcome of the discovery process is a function of the proximity between WTRUs, for example, given that interference may be deemed to be at an acceptable level for the allocated resources.

The WTRU may identify one or more of the resources used for transmission using indices. A reporting mechanism may include resource usage. Resource usage may include information related to past transmissions of a discovery signal for a given resource allocation. For example, resource usage may include information related to planned and/or scheduled transmission of a discovery signal and/or transmissions of a discovery signal that happened in a past configured time period. Reporting may be assembled by a transmitting WTRU. Reporting may be received by a network node, for example, a node from which the WTRU has received the configuration for the resource allocation for transmission of discovery signals. Reporting (e.g., which may include format, triggers, time windows, and/or the like) may be configured, for example, together with the resource allocation.

The network node (e.g., a base station such as an eNB) may configure one or more transmitting WTRUs that are configured with similar resource allocation for reporting. When the network node receives one or more reports, the network node may use the received information to derive collision probability for a resource. The network node may determine whether or not such probability is above a threshold. If above a certain threshold, the network may initiate a reconfiguration for one or more WTRUs, for example, such that the discovery signals are better spread across the allocated resources in the cell.

WTRUs may be in proximity of each other but the interference levels (e.g., which may be due to collisions within the resource used for the discovery signal) may impair other WTRUs from properly receiving the discovery signal. The WTRUs and/or the network may determine whether another WTRU did not discover the WTRU, for example, because the WTRU is not in proximity and/or because of the collisions.

A D2D discovery may be a Type 1 D2D discovery where a WTRU may select a resource. A D2D discovery may be a Type 2 discovery where a network element may select a resource for a WTRU. A D2D communication may be a Mode 1 D2D communication where a network elements may control resource and/or transmission parameters for a WTRU. Mode 1 D2D communication may be used when the WTRU is in coverage. A D2D communication may be a Mode 2 D2D communication where a WTRU may determine resources(s) and/or transmission parameter(s). Type 1 D2D discovery may be similar to Mode 2 D2D communication.

D2D communication transmission may take place under network coverage or outside of network coverage. A WTRU may be configured to operate without network control (e.g., in Mode 2 D2D communication), for example, while WTRU communications under network coverage may be controlled by a network base station and/or an eNB (e.g., Mode 1). A WTRU may select resources for transmissions autonomously when, for example, WTRU communications take place outside of the network coverage. The network may be unaware of potential high interference situations. The network may be made aware of the D2D resources utilization, for example, so that resources may be available for D2D communications.

Collisions of the SA and/or data may occur when outside of network coverage. Collisions of the SA and/or data may occur between a WTRU controlled by an eNB and another WTRU outside network coverage.

The network may re-use (e.g., allocate) the same resource to one or more WTRUs when, for example, under network coverage. WTRUs may be in proximity when a network may not be aware of the geographical location of some WTRUs. The transmissions may collide on the same resources.

The report may include one or more of the following. The report may include the identity of resources (e.g. the concerned resources), the identity of the discover process and/or event, location information, the outcome of a discovery process and/or event, the outcome of one or more transmission events, measured resource utilization, whether network resource configuration may be insufficient, a report by a monitoring WTRU on the outcome of discovery signal decoding, and/or the like.

A concerned resource may refer to a resource used for transmissions of direct WTRU-to-WTRU signals, for example, a discovery signal transmission, SA, data pattern index, and/or the like. For example, the report may include one or more indices describing one or more of the resources (e.g., in time/frequency, for example subframe(s) or PRB(s)), which may be used for transmission.

A reported resource may be associated with one or more of the following. For example, a reported resource may indicate the resource for which the WTRU has performed a transmission. For example, the reported resource may indicate a resource for which the WTRU has performed a transmission within a period, for example, the last Z resource allocation period (e.g., a frame, a period represented by Y TTIs, Y ms, and/or Y frames). The period may be configurable. The report may be sent by a transmitting WTRU.

For example, a reported resource may indicate a resource for which the WTRU may be expected to perform a transmission, for example, a transmission that may not have been performed at the time the WTRU assembles (e.g., generates) the report. For example, the reported resource may indicate a resource for which the WTRU may be expected to perform a transmission for a period, for example, the next Z resource allocation period (e.g., a frame, a period represented by Y TTIs, Y ms, and/or Y frames). The period may be configurable. The report may be sent by a transmitting WTRU.

For example, a reported resource may indicate an index of a resource for which the WTRU has measured the largest amount of energy (e.g., one or more). For example, a reported resource may indicate an index of a resource for which the WTRU has measured the largest amount of energy within a period, for example, the last Z resource allocation period (e.g., a frame, a period represented by Y TTIs, Y ms, and/or Y frames). The period may be configurable. If multiple resources are reported, the signaling format may include means for the receiver to determine the number of elements in the report, for example, by including the total number of elements in the report. The report may be sent by a monitoring WTRU and/or by a transmitting WTRU. For example, a reported resource may indicate an index of a resource for which collision has been detected.

For example, a reported resource may indicate an index of the resource or index of patterns for which a transmission failed (e.g., no acknowledgment(s) where received or a percentage of the transmissions were not acknowledged)

For example, a reported resource may indicate an index of a resource for which a near-far effect has been detected.

For example, the WTRU may report an index corresponding to a set of resources and/or a process identity (e.g., an entity receiving the report may determine the concerned set of resources) followed by zero (e.g., if no transmission has occurred for the reporting period). The WTRU may report one or more indices each corresponding to a resource in which the WTRU has performed a transmission and/or is expected to have performed a transmission. A report may include the identity of the discovery process and/or event. An identity may be associated with a concerned resource and/or may identify (e.g., implicitly identify) a concerned resource. A monitoring WTRU may report the ID of a transmitting WTRU with a discovery signal that has been successfully decoded on a resource and/or a set of resources (e.g., identification may correspond to the ProSe ID decoded on the discovery resource). A WTRU may report the ID of one or more transmitting WTRUs, for example, when near-far effect causes issues (i.e. when received power is strong, when received power is faint). A WTRU may report the ID carried on the SA of interest. A WTRU may report the ID carried on the SA associated to the D2D data transmission for which the WTRU is reporting.

A report may include location information. Location information may be associated with a discovery signal transmission, a discovery signal reception, and/or the report. A WTRU (e.g., a transmitting WTRU and/or a receiving WTRU) may determine its location, for example, based on the cell ID, GPS information, and/or other location information. The WTRU may include the location information in the report.

A report may include an outcome of a concerned discovery process and/or event. If the WTRU has means to determine whether or not a discovery process and/or event has been successful, the WTRU may report the outcome for the concerned resource, discovery process, and/or event. For example, a WTRU may determine that the outcome is successful for a discovery process and/or event that may be multidirectional. A multidirectional discovery process and/or event may be from the reception and/or detection of a discovery signal from another WTRU, for example, as a response to its own transmission. A multidirectional discovery process and/or event may be from the establishment of a direct communication channel with one or more WTRUs subsequent to the transmission of the discovery signal for the concerned resource(s) and/or for the concerned discovery process and/or event.

A report may include the outcome of at least a transmission attempt. A transmitting WTRU may report a failure to transmit a D2D or discovery message (e.g., due to no and/or limited available resources for a WTRU to transmit a discovery signal, for example, for a defined period of time, and/or due to a collision on a resource with another transmission.

A report may include the outcome based on resource availability. The WTRU may determine that insufficient resources are available for transmission (e.g., of discovery signal, SA or D2D data) according to one or a combination of the following.

The WTRU may determine that insufficient resources are available for transmission when the measured received energy on one or more of the resources (e.g., all resources) are above a certain threshold. Resources may be considered to be occupied by other WTRUs.

The WTRU may determine that insufficient resources are available for transmission when the WTRU determines other WTRUs are using one or more of the resources (e.g., all resources), for example, which may be determined by means of receiving announcement messages (e.g., SA) and/or other messages indicating which resources are being used. There may be no resource available for the WTRU to transmit, for example, a discovery signal, SA or D2D data.

The WTRU may determine that insufficient resources are available for transmission when the network is not allocating any resource for a D2D WTRU, for example, within a time period.

The WTRU may determine that insufficient resources are available for transmission. The WTRU may determine the number of resource available is insufficient (e.g., for the WTRU to meet the required and/or target discovery QoS, transmission rate, and/or D2D data) for example, based on the received energy measured on the resources, a certain threshold, and/or based on the received SA, This may be determined, for example, for a period of time.

The transmitting WTRU may report after one or more successful transmissions. A successful transmission may include the WTRU finding available resource(s) to transmit a discovery signal. The WTRU may report one or more of the following information associated with a successful transmission.

The WTRU may report the number of transmission attempts before the WTRU can successfully perform a transmission of, for example, a discovery signal, D2D transmissions, D2D data, and/or SA (e.g., the number of sub-frames in which no resources were available). A transmission attempt may include one or more discovery sub-frames in which the WTRU attempts to transmit a D2D transmission, for example, over the air on an allowed discovery resource. For example, the WTRU may determine that an attempt has failed if the WTRU is allowed to transmit on the D2D resource(s) but does not find an available resource (e.g., the measured energy on the resource is above a threshold) for one or more subframes.

The WTRU may report the average time it takes to successfully transmit a discovery signal, for example, which may be determined to be the time it is available for transmission to the time it takes to transmit it over the air. The average time may be determined over a number of discovery signal transmissions, over a number of discovery periods, and/or within a single period. The WTRU may report the ratio of attempts to success. The WTRU may report the amount of D2D data. The WTRU may report the number of D2D data transmissions carried out by the WTRU (e.g., in terms of MAC PDUs, total data delivered, data rate, etc.).

The transmitting WTRU may send the report after determining that it has insufficient resources to meet its target QoS and/or discovery transmission rate, for example, for a configured amount of time. The WTRU may report resource availability, resource utilization, and/or the amount of resources used by the WTRU to meet its target QoS and/or discovery transmission rate, for example, as determined per the WTRU discovery processes and/or D2D data configuration.

The report may include the outcome based on transmission acknowledgement. A WTRU may have means to determine whether a transmission or a plurality of transmissions within a time period were successful by, for example, reception of acknowledgment of transmitted PDU (e.g. HARQ, RLC, TCP/IP ACK, etc.). A WTRU may determine that a PDU or a plurality of PDUs within a time period were not delivered, for example, due to lack of acknowledgment for those PDUs, or lack of a response from the receiving WTRU. For example, a WTRU may consider a transmission successful if a PDU was acknowledged. A WTRU may consider a transmission unsuccessful if, for example, a PDU exceeds its retransmission attempts without receiving an ACK. A WTRU may report failure to transmit on a given resource, a plurality of configured resources for reporting, or a resource plurality (e.g., a pattern) within a time. A WTRU may report number of failures or successes over total transmission opportunities/attempts in a time period. A WTRU may report percentage of failures over transmission opportunities. A WTRU may report success rate or failure rates on a resource. A WTRU may report a plurality of configured resources for reporting. A WTRU may report a resource plurality (e.g., pattern) measured within a time. A WTRU may report an index of the resource, resource plurality or pattern used for the transmission in which failure to transmit may have been detected. A WTRU may report TTIs in which failure may have been detected.

The report may include the measured resource utilization. The transmitting and/or monitoring WTRU may report the measured resource utilization while attempting to transmit and/or receive a discovery signal, for example, over a period of time regardless of whether it is attempting to transmit or not. The resources a WTRU is measuring may be configured by the network. A WTRU may determine the resources to measure based on, for example, the available resources for D2D transmissions (e.g., discovery, SA, data and/or data patterns). The report may include the average number of occupied and/or available resources (e.g., discovery signal resources, SA, D2D data pattern) per subframe over a defined period (e.g., a discovery occasion, a D2D data scheduling interval) and/or over a number of subframes. The report may include the total and/or average number of occupied and/or available resources per subframe (e.g., with an energy above and/or below a threshold, or based on successfully detected SA, and/or based on successfully decoded discovery signals). The report may include whether a pattern is occupied or available. A pattern may be considered occupied if one or more resources (and/or transmission opportunities) within the pattern are considered occupied (e.g., based on energy level measurements on those resources). A WTRU may report an occupied pattern. A WTRU may report the number of occupied patterns over available patterns. A WTRU may provide for a configured pattern to report. For example, a WTRU may provide a configured pattern to report on whether the pattern is occupied or not. The report may include the minimum number of occupied and/or available resources and/or subframe in which this minimum value occurred. The report may include the number of subframes within a defined period, for example, in which x resources or less where available (e.g., or y resources or more where occupied), and/or where x and y are numbers configured by the network.

The report may include a metric that may indicate a percentage, a ratio or a number of resources that are occupied and/or available in a subframe and/or a set of subframes, for example, within a defined period. The report may include the metric during a period of time (e.g., a D2D scheduling period). The report may include an average of the number of resources or the actual number of resources (e.g., or the percentage of resources) on subframe(s) over a defined period (e.g., one subframe, a plurality of subframes, and/or a discovery occasion) with a measured energy level above a threshold, below a threshold and/or those resources for which a signal (e.g., SA<discovery, D2D data) was successfully detected. The threshold may be configured by the network as part of the configuration message and/or may correspond to the threshold used by the WTRU to determine whether a resource is available for transmission or not.

The report may include the amount of energy the WTRU measured. The amount of energy may be measured on a resource(s) and/or on a set of resources over a subframe and/or a set of subframes. The WTRU may report an index to a resource, a plurality of resources (e.g., a pattern), the measured energy level, and/or the subframe in which the measurement was taken. The WTRU may report an index to a resource and/or an average measured energy on the resource(s) over a period time. The report may include the amount of energy on one or more resources with the largest energy (e.g., largest X energy amounts).

The report may indicate that the network resource configuration may be insufficient. The transmitting WTRU may be configured to report that the amount of resources currently allocated by the network (e.g., in the current cell) are insufficient for the WTRU to meet the QoS and/or transmission rate of the WTRU discovery process or D2D data transmission. The WTRU may report after a new configuration is received (e.g., from the SIBs) and/or after the WTRU has changed cell (e.g., in Idle mode) and the amount of resources allocated in the new cell are insufficient for the WTRU. The WTRU may report to the network the amount of resources required for the WTRU to meet its target QoS and/or discovery transmission rate, for example, as determined per the WTRU discovery processes configuration or D2D data transmission configuration.

The report may include a report by a monitoring WTRU on the outcome of discovery signal or D2D transmission decoding. For example, the monitoring WTRU may report a number and/or rate of failures and/or successes on a dedicated resource, a plurality of resources, or a received data pattern (e.g., for type 2 discovery, mode 1 communications, or type 2 discovery) (e.g., the rate of successful reception over one or more scheduled occasions. The report may indicate a decoding failure, which for example, may refer to when the monitoring WTRU fails to decode the discovery signal or D2D transmission on a resource. The report may indicate a decoding success, which for example, may refer to when the monitoring WTRU successfully decodes the discovery signal on a resource. The report may indicate a decoding failure or decoding success for one or more (e.g., a plurality of) resources. A WTRU may attempt decoding D2D transmissions on a particular resource set within a scheduling period (e.g., WTRU decoded the SA indicating transmission opportunities for the WTRU). A WTRU may count the number of successful or failed decoding attempts. A WTRU may count the number of successful or failed HARQ processes. A report may include decoding failure for a plurality of resources (e.g., X out of Y HARQ processes have failed or a percentage of the detected failures over total reception opportunities within a scheduling period have been observed). The report may indicate the rate of a decoding failure and/or success, which for example, may refer to the ratio between the number of failures and/or successes on a resource and/or a total number of decoding. The number may be the total number of failures on each resource, the average number of failures over all resources in a subframe, and/or the average number of failures on a single resource over a number of subframes.

The report may indicate the number of resources on a subframe (e.g., or average thereof) in which the WTRU detected the presence of a discovery signal or data transmission but failed to successfully decode the signal. The WTRU may consider that it detected the presence of a discovery signal when one or more of the following occurs: the received total energy measured over the resource is above a threshold and/or the received level of a reference signal measured over the resource (e.g., a correlator implementation) is above a threshold. The reference signal may be a signal of known properties.

The WTRU may determine a failure to decode based on a cyclic redundancy check (CRC) transmitted, for example, along with the remaining payload of the discovery signal. The CRC may be masked with a RNTI known by the receiving WTRU, for example, within a period The period may be configurable. The period may be the last Z resource allocation period (e.g., a frame, a period represented by Y TTIs, Y ms, and/or Y frames, and/or the like). The WTRU may determine a success to decode a signal based on successfully receiving and/or verifying a CRC.

The report may indicate the number of resources in which a discovery signal was received on a subframe and/or a number of subframes. The report may indicate the number of failed decoding attempts and/or number of subframes in which a discovery signal was successfully decoded and/or passed to higher layers.

The report may indicate an index of the resource(s) on which the monitoring WTRU fails to decode the discovery signal(s), for example, within a period. The period may be configurable. The period may be the last Z resource allocation period (e.g., a frame, a period represented by Y TTIs, Y ms, and/or Y frames, and/or the like). The report may be sent by a monitoring WTRU. The report may include a number of successfully decoded SA transmissions in a time interval. The report may include the number of successfully decoded SA transmissions for the associated data transmission, for example, as determined by the identifier in the SA or via the higher layers (e.g., MAC header, ProSE Identifier, etc.). The report may include the identity associated with an SA that may be determined to cause issues, such as interference/near-far effect. The report may include the identity associated to an SA for which SA detection may be successful but data reception may fail (e.g., for a duration of time).

The report may include an interference level that measured by the WTRU. The WTRU may be configured perform a noise measurement, for example at a noise measurement occasion. For example, the network may not schedule a D2D or cellular communication during one or more subframes and the WTRU may perform the noise measurement during the unscheduled subframe(s). The WTRU may take noise measurement periodically, for example at one or more interference measurements occasions. The WTRU may be configured to measure the level of interference over the set of allocated D2D resources (e.g., discovery time/frequency resources). The WTRU may be configured to report the level of interference above the noise level based on a measurement. The WTRU may be configured to report when the measurement is above or below a configured threshold.

The report may be bound in size, for example, such that at most a number of elements are included in the report and/or a maximum number of reference period(s) may be reported.

There may be one or more triggers for the WTRU to create (e.g., generate) and/or send (e.g., transmit) the report. For example, the WTRU may initiate the creation and/or transmission of a report when it receives L3 signaling that requests a report. The WTRU may initiate the transmission of a report when the WTRU is configured for reporting and another trigger initiates transmission of the report. The signaling may be specific to a discovery process and/or event (e.g., associated to a single identity), to a subset of discovery processes and/or events (e.g., associated with one or more identities and/or per type of resource allocation), and/or may be WTRU-specific (e.g., applicable to one or more identities). For example, the WTRU may initiate the transmission of a report if there is at least one or more transmissions applicable for the reporting period. The WTRU may transmit the reports alone and/or as part of a message reporting successful decoding of a discovery signal of interest, for example, to the ProSE server. The ProSE server may forward the report to the RAN and/or provide information (e.g., load/configuration information) to the RAN, the MME, eNB, etc.

The WTRU may initiate the creation and/or transmission of a report periodically, for example, if there is at least one or more transmissions applicable for the reporting period. For example, the reporting may be periodic at the end of a discovery occasion and/or after a number of discovery occasions. A WTRU may be configured to report periodically in D2D communications, for example, along a periodical BSR.

The WTRU may initiate the creation and/or transmission of a report in an aperiodic manner. The WTRU may initiate the transmission of a report via the reception of control signaling that requests that the WTRU perform the reporting. The signaling may be received from a network node. The signaling may be dedicated signaling and/or signaling applicable to a plurality of WTRUs (e.g., received on a broadcasting channel and/or on a common control channel). For example, signaling may be carried along with a grant transmitted by an eNB. The WTRU may initiate the transmission of a report in an aperiodic manner, for example, if there is at least one or more transmissions (e.g., configurable transmissions) applicable for the reporting period.

The signaling may indicate one or more WTRUs (e.g., using a common identity, such as scrambling of a request using a common RNTI and/or a request sent on a common control channel). The signaling may indicate one or more WTRUs configured with at least one resource allocation (e.g., a WTRU configured for discovery and/or for direct WTRU-to-WTRU communications). The signaling may indicate the resource allocation for which the reporting is applicable. For example, the control signaling may include resource allocation information and/or indexing, for example, such that a WTRU may determine whether or not it corresponds to one or more of its resource configurations. If the WTRU determines that the resource allocation information and/or indexing correspond to one or more of its resource configurations, the WTRU may initiate the reporting for the resource. The signaling may indicate the identity of the process and/or event. For example, the control signaling may include an identity, for example, such that a WTRU may determine whether or not it corresponds to one or more of its processes. If the WTRU determines that the identity of the process and/or event corresponds to one or more of its processes, the WTRU may initiate the reporting for the resources associated to the process and/or event. The WTRU may initiate the creation and/or transmission of a report based on a change of operation status. For example, the report may be triggered after the last subframe of the discovery period and/or occasion. The WTRU may report to the network when it resumes normal operation with the eNB. The report may be triggered after a scheduling period is completed. For example, a WTRU may transmit a report after a configurable number of scheduling periods.

The WTRU may initiate the creation and/or transmission of a report based on an outcome of a discovery or data transmission process and/or event. For example, the WTRU may initiate reporting when it determines that the discovery or transmission of data is not successful. For example, the WTRU may initiate reporting when the WTRU has determined that the discovery or data transmission has not been successful for a certain period of time and/or for a certain number of attempts (e.g., a period with at least one transmission of a discovery signal), which may be configurable aspects of the reporting.

The WTRU may initiate the creation and/or transmission of a report based on an outcome of SA reception/transmission. A WTRU may initiate reporting when it determines that reception of a configurable number of SA is not successful. A WTRU may initiate reporting when it determines that it may not have transmitted the SA a configurable number of times, for example, when no SA resource is available.

The WTRU may initiate the creation and/or transmission of a report based on an outcome of the physical layer discovery signal decoding by a monitoring WTRU. For example, the WTRU may initiate a report to the network when it determines that a certain rate of decoding failures and/or successes has been reached. For example, the report may be triggered when the WTRU detects that a certain number of decoding failures have occurred in one or more allowed discovery subframes or D2D communications subframe (e.g., as defined by transmission pattern).

The report may be triggered when the WTRU detects a failure trigger by a monitoring WTRU. A report may be triggered when the WTRU fails to decode a configured number of discovery signals or data reception opportunities on one or more resources, for example on a subframe and/or over a number of subframes (e.g., consecutive subframes, a number of subframes over a configured period, as indicated by a data pattern, and/or the like). A report may be triggered when the rate of decoding failures of D2D transmission (e.g., a discovery signal or D2D data) is above a threshold on a subframe and/or a number of subframes (e.g., consecutive subframes, a number of subframes over a configured period, and/or the like). The rate of decoding failure may be determined to be the number of failed decoding attempts over the number of total decoding attempts on resources in which a discovery signal is being transmitted. The rate of decoding failure may be determined to be the number of failed decoding attempts over the total number of monitoring resources. A report may be triggered when a WTRU determines the rate of failure of SA or D2D data communications (e.g., in terms of block error rate, BER, outage, etc.) during a period of time. A report may be triggered when a WTRU reports to the network when the rate of failure is larger than a threshold.

A report may be triggered based on the success of packets decoded (e.g., the number of successfully decoded packets over the total number of attempts).

A report may be triggered based on an outcome of a transmission attempt by a transmitting WTRU. For example, the WTRU may initiate the transmission of a report based on the outcome of a transmission attempt (e.g., failure to transmit, the number of attempts before a successful transmission, and/or the like). A failure to transmit may refer to the WTRU not finding an available resource for transmission on a discovery resource (e.g., an allowed discovery resource) in one or more discovery subframes (e.g., allowed discovery subframes). An attempt to transmit may include the WTRU trying to transmit a discovery signal over one or more allowed resources, for example, on a discovery subframe. A successful transmission may include the WTRU finding an available resource for transmission and/or transmitting the discovery signal over the air. For example, attempt to transmit may refer to a WTRU trying to transmit an SA and/or the associated D2D data, such as for D2D data communications. A successful transmission may refer to a WTRU finding available resources for transmission of the SA and the associated D2D data, such as in D2D data communications.

The WTRU may initiate the creation and/or transmission of a report based on a failure to transmit. For example, the WTRU may initiate the creation and/or transmission of a report as a result of failures to transmit at least a discovery signal in a set of available discovery resources (e.g., resource pool). The failure to transmit may be when the WTRU fails to transmit in a given sub-frame or a set of sub-frames. The failure to transmit may be when the WTRU fails to transmit the discovery signal within a discovery occasion. The failure to transmit may be when the WTRU fails to find a resource for transmission over a configured period of time. The failure to transmit may be when a WTRU fails to transmit an SA and/or associated data within a period (e.g., the period for which a network grant may be valid). The failure to transmit may be when a WTRU fails to find a resource for transmission of an SA and/or associated data within a period (e.g., the period for which a network grant is valid). The failure to transmit may be when the WTRU detects that it failed to transmit a configured number of times during a period of time T. For example, the failure count over a period of time may be related to multiple transmissions of discovery signals within a discovery occasion and/or multiple discovery occasions, or for D2D data communications to one or more PDCP, MAC or RLC PDUs (e.g., the WTRU may have X failures among Y discovery subframes within a discovery period, a WTRU may have X MAC PDU failures among Y new data transmission occasions within a scheduling period). The failure to transmit may be when the WTRU detects that the number of failures for a discovery signal transmission attempt is above a threshold within a configured period of time (e.g., if for each attempt to transmit a discovery signal the WTRU fails to transmit for a period of time). The failure to transmit may be when the WTRU fails to transmit over a configured number of consecutive allowed discovery subframes. The failure to transmit may be when the WTRU fails to find sufficient resources for transmission to achieve the target QoS and/or discovery transmission rate over a configured period of time.

The WTRU may initiate the creation and/or transmission of a report based on a number of attempts before a successful transmission. For example, the WTRU may report to the network based on the number of attempts before the WTRU successfully transmits one or more a discovery signals or D2D data communications signals. The report may be triggered when the WTRU has more than X tries before a success for a given transmission and/or a number of transmissions. The report may be triggered when the average time before success for a given WTRU is larger than a threshold. The report may be triggered when the success rate (e.g., the number of successes/the total number of tries) is lower than a threshold.

The WTRU may initiate the creation and/or transmission of a report based on a measured resource utilization. For example, the WTRU may initiate a report based on a measured resource utilization status. The report and resource utilization may be measured by a transmitting WTRU and/or a monitoring WTRU. A discovery measured resource utilization may refer to a WTRU performing a measurement on a discovery resource in one or more subframes and/or measuring the energy level on the resource.

A trigger related to resource utilization may be when the number of resources (NR) with measured energy below a threshold in a subframe is below a configured threshold, for example, over a period of time. The period of time may be, for example, a subframe, a configured number of subframes, a number of consecutive subframes, a percentage of allowed discovery subframes within a discovery occasion, and/or the like. A trigger related to resource utilization may be when the number of resources (NR) with measured energy above a threshold in a subframe is above a configured threshold over a period of time.

A trigger related to resource utilization may be when the average measured energy over all or a subset of discovery resources in subframe is above or below a threshold, for example, for a period of time. A trigger related to resource utilization may be when the ratio of resources with measured energy below or above a threshold over the total number of discovery resources in a subframe is below or above a threshold, for example, over a period of time.

A trigger related to resource utilization may be when the WTRU determines that the resource utilization over a configured period of time (e.g., based on the ratio and/or number of resources with measured energy below or above a threshold) is insufficient for the WTRU to meet the target QoS and/or discovery transmission rate.

The WTRU may initiate the creation and/or transmission of a report based on a measured resource utilization in, for example, D2D communications. For example, a WTRU may initiate a report based on a measured resource utilization status, for example, in D2D communications. The report and resource utilization may be measured by a transmitting WTRU and/or a monitoring WTRU.

A trigger related to resource utilization may be when the number of SA resources successfully decoded is above a configured threshold.

A trigger related to resource utilization may be when the number of SA resources successfully decoded is below a configured threshold.

A trigger related to resource utilization may be when the number of D2D data PRB (e.g., as indicated by the aggregated received SAs) is above a configured threshold.

A trigger related to resource utilization may be when the number of D2D data PRB (e.g., as indicated by the aggregated received SAs) is below a configured threshold.

A trigger related to resource utilization may be when the energy measured in a configured plurality of PRBs (e.g., associated to D2D data communications) is above a threshold.

A trigger related to resource utilization may be when the energy measured in a configured plurality of PRBs (e.g., associated to D2D data communications) is below a threshold.

A trigger related to resource utilization may be when a WTRU determines that the resource available may be insufficient to meet the target and/or required QoS for a D2D data transmission service (e.g., VoIP, video streaming, etc).

A WTRU may be configured to trigger transmission of a report upon detection of a change in coverage situation and/or D2D transmission mode (e.g., Mode 1 (eNB controlled), Mode 2 (non-eNB controlled)). A WTRU may be configured to trigger transmission of a report. A WTRU may be configured to trigger transmission of a report when a WTRU enters eNB coverage. For example, a WTRU may detect that it has uplink coverage when a WTRU successfully connects to the eNB (e.g., RRC connected state).

A WTRU may be configured to trigger transmission of a report when a WTRU enters Mode 1. A WTRU may be configured to transmit a report when a WTRU is configured to operate in Mode 1.

A WTRU may be configured to trigger transmission of a report when a WTRU changes cells. A WTRU may be configured to transmit a report to a new eNB, for example, after a handover. A WTRU may be configured to transmit upon transmission of a tracking area update. A WTRU may be configured to transmit when a WTRU is configured with D2D data communications and changes cell, for example, in Idle mode.

The WTRU may transmit a report using L2 (e.g., MAC) signaling (e.g., as a MAC Control Element), as L3 (e.g., RRC) signaling (e.g., as a RRC PDU, for example, as part of a reporting procedure), and/or as higher layer signaling (e.g., NAS signaling, application signaling, and/or the like). For example, the WTRU may receive control signaling on the PDCCH (e.g., an aperiodic request) that triggers reporting. The WTRU may assemble the report as a MAC control element and include it in an uplink transmission (e.g., the next uplink transmission). The eNB may be the endpoint of the reporting procedure.

The WTRU may receive a request on a signaling radio bearer (SRB) as an RRC PDU that triggers reporting. For example, the WTRU may assemble the report as a RRC PDU and make it available for transmission on the SRB.

The WTRU may trigger reporting at the application level. For example, the WTRU may assemble an application layer control packet and make it available for transmission as a RRC PDU (e.g., and make it available for transmission on the concerned SRB (e.g. in case NAS is used)) and/or as a user plane data (e.g., and make it available for transmission for a corresponding DRB). The ProSe and/or the application server may be the endpoint of the reporting procedure.

The WTRU may trigger reporting if the WTRU is in RRC IDLE mode. For example, the WTRU may initiate a transition to CONNECTED mode and transmit the report according to the applicable signaling method. The WTRU may remain in IDLE mode and delay the transmission of the report until it moves to CONNECTED mode, for example, if RRC and/or a higher layer protocol is used.

A network node (e.g., a base station, for example an evolved Node B (eNB)) may receive the report. The network node that receives the report may determine the blocking rate for a given resource, for example, if the report is received from multiple sources. The network node that receives the report may initiate a procedure that reconfigures the resources for one or more WTRUs such that the estimated rate may be lower, for example, if the rate is above a certain threshold.

Discovery signal transmission control for resource management may be provided. A network entity (e.g., an eNB, a ProSe server, and/or the like) may have direct control over the transmission of discovery signals, for example, for the purpose of managing resources allocated to D2D.

A WTRU may suspend and/or resume transmission of a discovery signal in one or more resources following the reception of signaling from the network. The network may utilize this functionality, for example, to assess the level of interference and/or the load generated by one or more WTRUs and/or to diagnose and/or temporarily relieve a congestion situation in a resource. For example, the network may determine that a WTRU may cause excessive collisions and/or interference to other WTRUs in a resource by suspending transmissions from the WTRU and/or receiving reports from one or more other WTRUs that indicate improved performance after the suspension. The network may take corrective actions, for example, re-assigning the WTRU to a different set of resources, restricting the WTRU to use a resource within a specific set of resources (e.g., a resource from a particular resource pool), increasing the amount of resources available for discovery signal transmissions, and/or the like. When the WTRU receives signaling indicating suspension of transmission, the suspension may remain effective for a certain duration (e.g., until expiration of a timer started upon reception of the signaling) and/or until reception of signaling indication resumption of transmission. The duration of the timer may be configured by higher layers and/or may be indicated in the signaling.

The suspension and/or resumption of transmission may apply to one or more discovery signals that are transmitted by the WTRU. The suspension may be applicable to one or more (e.g., a subset of) resources. The discovery signal(s) and/or resources may be indicated in the signaling.

A WTRU may initiate transmission of one or more discovery signals in one or more resources following the reception of signaling from the network. The transmission may take place even if the WTRU would not have otherwise triggered transmission of a discovery signal, for example, based on an application and/or based on a configuration from a ProSe server. The network may utilize this functionality, for example, to control the load from discovery signal transmissions over a period of time where other WTRU's are configured to measure and/or report over a resource, for example, according to examples provided herein. This may allow the network to obtain information on a potential collision and/or interference issue between WTRUs more reliably and/or quickly than otherwise.

When the WTRU receives a transmission order (e.g., as per the above), a property of the discovery signal may be set to a specific value. The property may include the resource used for the transmission of the discovery signal, the discovery payload, an RNTI used to mask a CRC used for decoding the discovery signal, a value and/or configuration of the demodulation RS, and/or the like A value of a property may be configured by higher layers, be pre-determined, and/or be indicated in the signaling. A receiving WTRU may determine that a received discovery signal that has a property set to a specific value was transmitted for control and/or management purposes (e.g., only for control and/or management purposes). The receiving WTRU may determine that the received discovery signal may not include useful information to be passed to higher layers (e.g., except for reporting performance).

A WTRU that measures and/or reports over a resource may monitor one or more discovery signals that match the at least one property. The WTRU may transmit (e.g., periodically transmit) a discovery signal according to the above properties without receiving a signaling order. The transmission instances and/or property values may be configured by higher layers.

Signaling mechanisms in support of discovery transmission control may be provided. The signaling may be received at the physical layer, at the MAC and/or RRC sublayers, and/or at higher layers. For example, a WTRU may monitor downlink control information in a search space (e.g., the common search space) using an RNTI. The RNTI may be common to one or more WTRUs configured to transmit discovery signals.

The signaling may include a paging message, for example, received at the WTRU's paging occasion and/or at a paging occasion used for the purpose of discovery transmission control.

The signaling may include an indication (e.g., explicit indication) of the identity and/or set of identities of the WTRU and/or discovery signal(s) related to the command. A set of identities may be indicated with a group identifier. The mapping between a group identifier and a set of identities may be configured by higher layers (e.g., a WTRU transmitting a discovery signal may be configured with a group identities, for example, for the purpose of transmission control) and/or may include of a subset of bits (e.g., least or most significant bits) of the WTRU and/or discovery signal identity.

A WTRU may determine to act on the received signaling probabilistically. For example, the WTRU may draw a random number (e.g., between 0 and 1) and determine that it is concerned by the received signaling if the randomly picked number is below (e.g., or is above) a threshold. The threshold may be pre-determined, indicated in the signaling, and/or pre-configured by higher layers. The use of a threshold may allow the network to control the percentage of WTRUs and/or the percentage of discovery signals concerned by an order to initiate and/or suspend transmission.

A single signaling order may be interpreted as a suspension order by one or more WTRUs and/or as a transmission order by other WTRUs. For example, a WTRU receiving signaling may determine that it may initiate transmission of a discovery signal if its identity is included in a first signaled group identity. The WTRU receiving signaling may determine that it may suspend transmission of discovery signal(s) if it is not included in the first group identity and/or if it is included in a second group identity included in the signaling.

The signaling for controlling transmission for a first subset of WTRUs and/or discovery signal identities may be combined with signaling used for triggering the measurement and/or reporting over a discovery resource for a second subset of WTRUs and/or discovery signal identities.

Mechanisms to allow WTRUs to coordinate resource usage may be provided. Once a WTRU is configured with resources for transmission of a discovery signal, the WTRU may perform transmissions accordingly. If the WTRU is in-coverage with an eNB, the resource pool and/or dedicated resources may be preconfigured and/or dynamically configured by the network. If the WTRU is out-of-coverage of an eNB, the WTRU may obtain resource configuration from a stored pre-configuration and/or from a coordinating entity (e.g., cluster-head). The resources used by the transmitting and receiving entities may be coordinated, for example, if discovery/communication is supported when WTRUs in the coverage of the same configuring entity and/or associated with configuration entities that coordinate with each other. Issues may arise when a WTRU performs transmission and/or reception in multiple domains at the same time, for example, if the discovery/communication is supported in scenarios which are not coordinated.

For resource allocation, the WTRUs may be pre-configured with a resource pool to transmit/receive when operating in out-of-coverage mode. In particular, all WTRUs may be also preconfigured with resources to transmit and receive the resource configuration information (e.g. where to send control information message e.g. synchronization message). The WTRU may also be configured by a controlling entity what resources to use within a resource pool.

Figure 6:
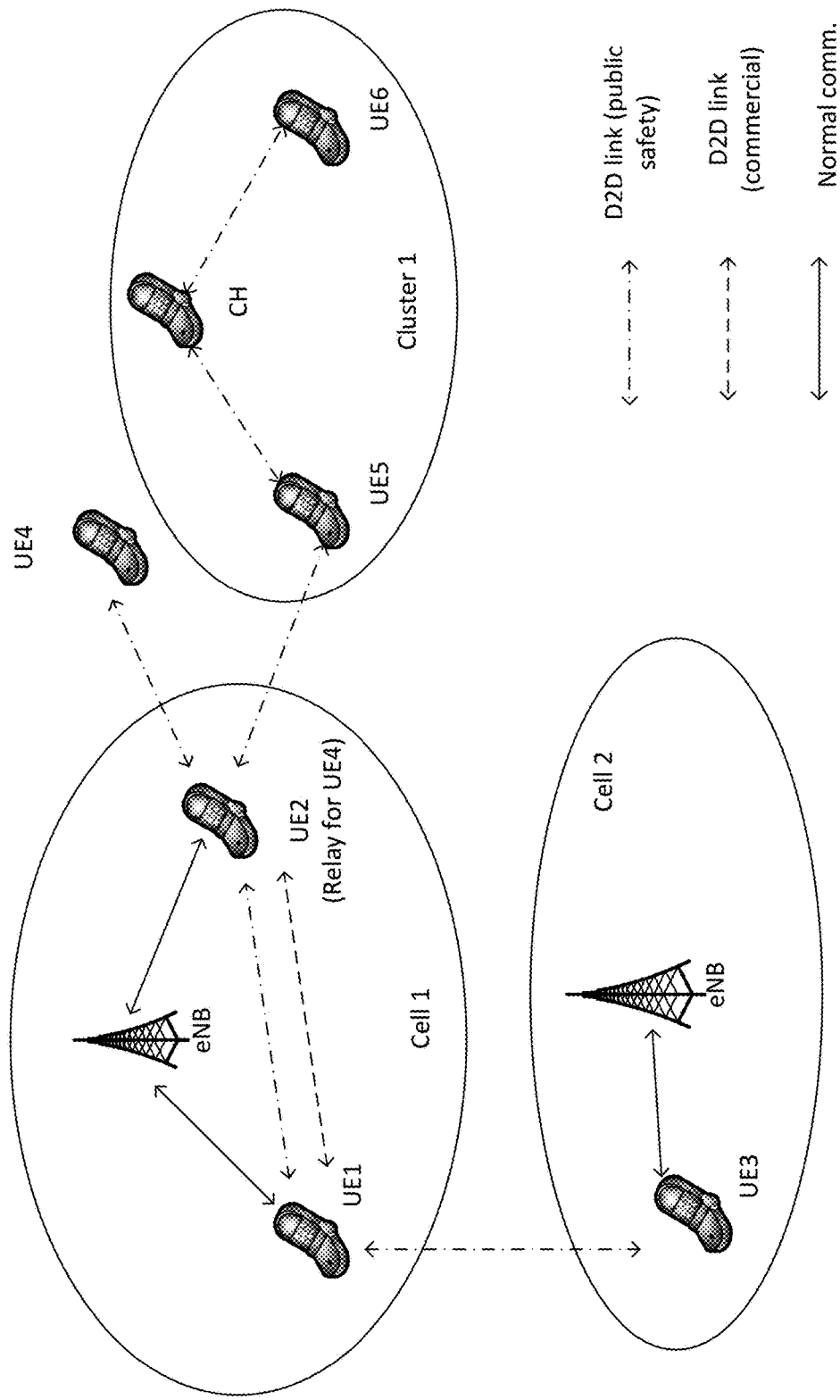
FIG. 6 is a diagram of an example of scenarios for in-coverage, out-of-coverage, and partial coverage D2D discovery and/or communications.

FIG. 6 is a diagram illustrating an example of scenarios for in-coverage, out-of-coverage, and partial coverage D2D discovery and/or communications.

The in-coverage WTRU may discover and/or be discovered by neighboring WTRUs that may be controlled by other uncoordinated controlling entities and/or may be operating in a different spectrum. Since the eNB may provide resource pools for in-coverage discovery, the WTRU may not be able to discover and/or be discovered by the neighboring WTRU, for example, if the neighboring WTRU is not monitoring the same resource pool. The in-coverage WTRU may move (e.g., autonomously move) to a public safety (PS) spectrum and/or out-of-coverage spectrum to perform reception and/or transmission, however, for example, without network coordination this may result in loss of data and/or loss of paging reception. Mechanisms to allow coordination between the eNB and the in-coverage WTRUs may be provided.

An in-coverage WTRU may determine to perform communication with an out of coverage WTRU, act as WTRU-to-Network relay with another WTRU, and/or determine to perform communication with a neighboring WTRU that may determine the set of resources to use by a pre-configuration and/or by a controlling entity (e.g., a cluster head)

which may not be coordinated with the serving eNB. The resources and/or time used for transmission by a neighboring WTRU may correspond to subframes in which the in-coverage WTRU may be performing normal cellular communications. The in-coverage WTRU may coordinate with the eNB to request time and/or resources in which it can communicate with the neighboring WTRU without negatively impacting the cellular connection with the eNB.

The WTRU may switch (e.g., autonomously switch) to transmitting and/or receiving on the resources in which the neighboring WTRU is expecting to receive and/or transmit. This may result in data loss, the WTRU not transmitting in the UL, and/or missing paging occasions while in idle mode. In order to avoid data losses and/or loss of paging, coordination between the eNB, the in-coverage WTRU, the out-of coverage WTRU, and/or the controlling entity out-of coverage WTRU may be provided, for example, for the WTRUs using a single transmit and/or receive. The coordination may involve coordination of time patterns in which this communication is expected to happen and/or a coordination of resources (e.g., frequency and/or time) in which this communication and/or discovery may take place.

The coordination may aim at allowing controlling entities to align the resources that the WTRUs involved in the communication are using and/or to be aware of scheduling restrictions during these time periods.

The network and/or coordinating entity may be made aware of resource allocation conflicts, for example, such that the network may re-allocate resources and/or schedule the WTRUs accordingly. For example, this may be performed for communication across different clusters that may be controlled by different entities. The eNB may refer to a cluster head and/or controlling entity in a group and/or cluster. The in-coverage WTRU may refer to a WTRU that is connected to the cluster head and/or controlling entity. A neighboring WTRU, PS WTRU, and/or out-of-coverage WTRU may refer to a WTRU that is configured to operate in direct communication. The resource pool and/or configuration for the neighboring WTRU, PS WTRU, and/or out-of-coverage WTRU may be controlled by an uncoordinated controlling entity different from the in-coverage WTRU and/or for which the resources are pre-configured.

The methods described herein relating to in-coverage and out-of-coverage may be applicable to allow coordination between a WTRU that may be controlled by different uncoordinated controlling entities or eNBs, etc.

Figure 7:
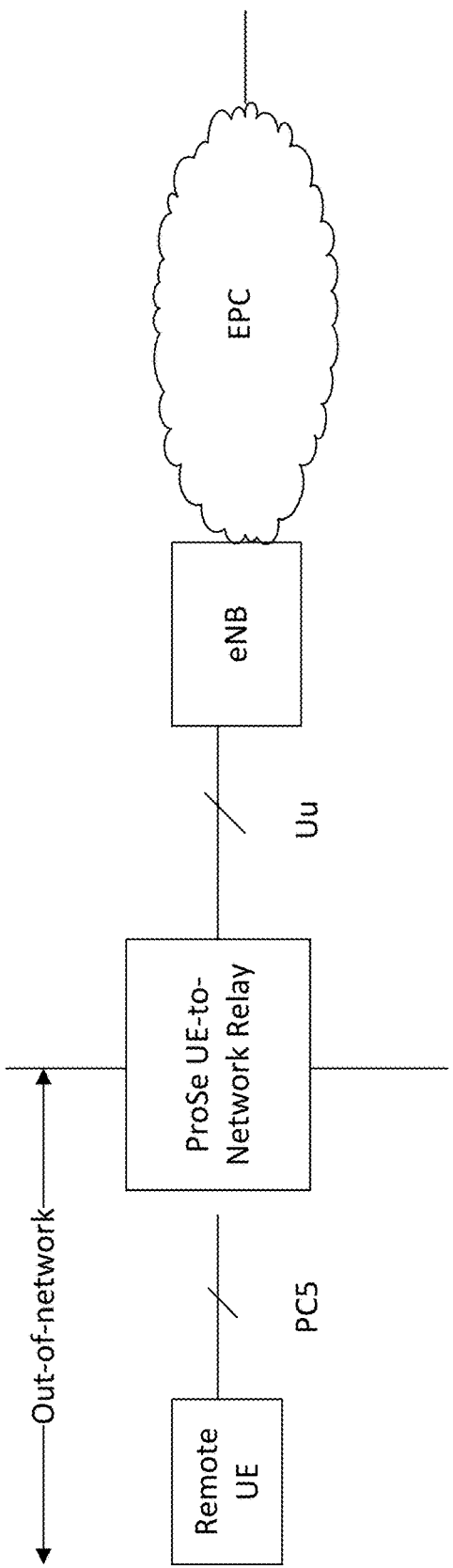
FIG. 7 is a diagram of an example scenario of communication between an in-coverage WTRU and an out-of-coverage WTRU.

An in-coverage WTRU may coordinate, request a gap(s), and/or request resources to communicate with an out-of-coverage WTRU. FIG. 7 is a diagram of an example scenario of communication between an in-coverage WTRU and an out-of-coverage WTRU. Interactions between an in-coverage WTRU and an out-of-coverage WTRU, for example, to negotiate resource allocation for the out-of-network link (e.g., PC5) may be provided. Interaction between the in-coverage WTRU and an eNB, for example, to support resource reconfiguration and/or gap/pattern configuration may be provided. The examples described herein may apply to the case where an in-coverage WTRU performs direct public safety communication on public safety resources.

Methods to negotiate resource allocation for out-of-coverage link may be provided. The in-coverage WTRU may have a coordinated time and/or gap pattern, for example, such that it may tune out of the cellular link without the risk of losing data. The out-of-coverage WTRU may be aware of when and/or where to expect to receive and/or transmit, for example, to ensure that interested parties may receive the communication.

A pattern for communication may refer to a time pattern (e.g., a period, a cycle, a duration, and/or the like) in which the WTRU may transmit and/or receive. A pattern for communication may refer to a time pattern for reception and a time pattern for transmission. A pattern for communication may include resource information, for example, such a frequency, subframe(s), PRB(s), and/or the like.

Figure 8:
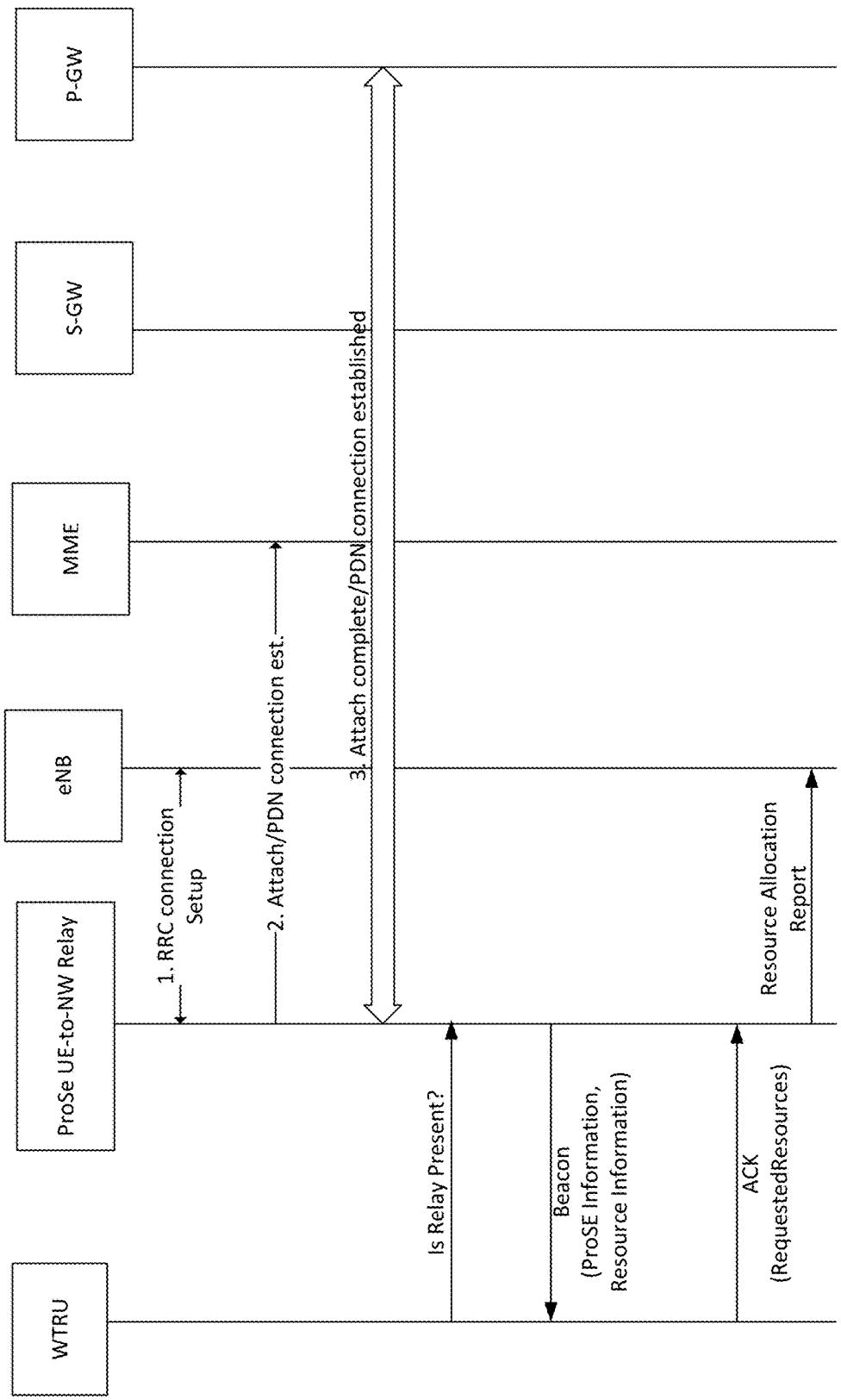
FIG. 8 is a diagram of an example of signaling that may be used for an out-of-coverage WTRU to determine and/or drive resource allocation.

An out-of-coverage WTRU may determine and/or drive resource allocation. FIG. 8 is a diagram of an example of signaling that may be used for an out-of-coverage WTRU to determine and/or drive resource allocation. Resource allocation may refer to a time, a gap pattern, and/or a time and/or frequency configuration for the PS link. For example, the out-of-coverage WTRU may provide and/or broadcast (e.g., in a known pre-configured resource) the resource allocation configuration it is configured to use and/or is using for communication. Resource allocation may be in the form of an SA, a broadcast synchronization message, a control message, and/or the like. The resource configuration may include the time and/or frequency pattern in which the PS WTRU is expecting to transmit and/or receive.

The WTRU may provide a resource configuration if it determines that an in-coverage WTRU is present. The WTRU may provide the resource configuration periodically or all of the time and/or prior to data transmission. The WTRU may provide the resource configuration when WTRUs operating in different spectrums are expected.

A WTRU (e.g., an in-coverage WTRU) may receive (e.g., from an out-of-coverage WTRU) a configuration and/or a time pattern. The WTRU may communicate the configuration information in a report to the eNB. The information communicated to the eNB may include a recommended gap pattern and/or frequency resources for the out-of-coverage WTRU, for example, for the out-of-coverage WTRU to use to communicate. The in-coverage WTRU may determine to send this information to the eNB, for example, if it determines that the out-of-coverage WTRU is a WTRU belonging to the same group as in the in-coverage WTRU (e.g., the WTRU is allowed to receive from this device). The eNB may reconfigure the resource pool it uses (e.g., for discovery and/or communication) and/or provide the in-coverage WTRU with gaps and/or scheduling opportunities to listen to the out-of-coverage link, for example, according to the resources provided by the out-of-coverage WTRU. The eNB may provide the gap pattern. The eNB may approve the use of the suggested gap pattern.

The gap pattern may be translated and/or adjusted according to the timing used by the controlling entity, for example, in the case where the timing and/or reference frame numbers used to determine the scheduling opportunities are different between an in-coverage WTRU and a neighboring WTRU.

Figure 9:
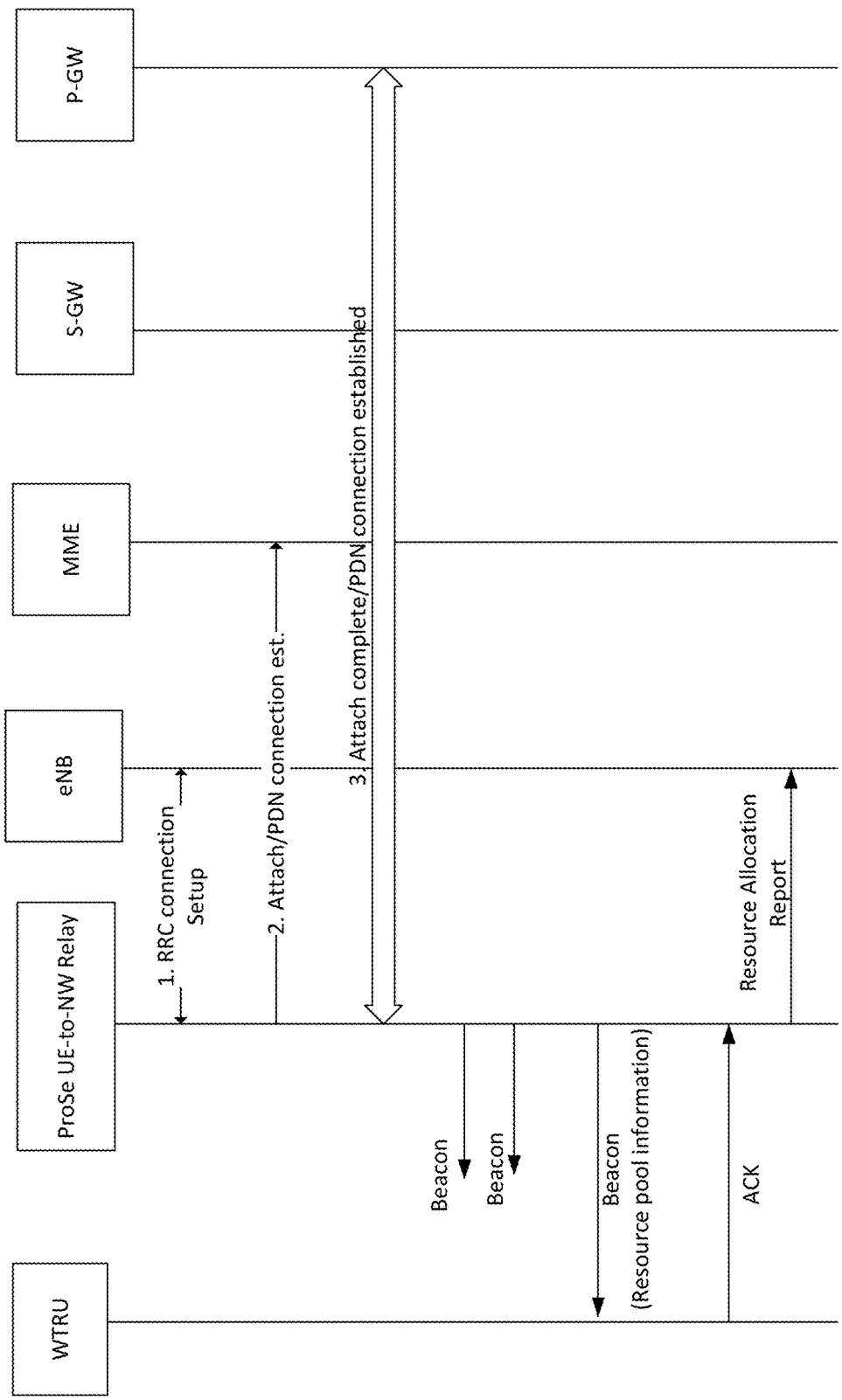
FIG. 9 is a diagram of an example of signaling that may be used for an eNB and/or an in-coverage WTRU to determine and/or drive resource allocation.

Resource allocation may be determined and/or driven by the eNB and/or the in-coverage WTRU. FIG. 9 is a diagram of an example of signaling that may be used for an eNB and/or an in-coverage WTRU to determine and/or drive resource allocation. The resource usage allocation for an out-of-coverage link may be driven by the in-coverage WTRU and/or the eNB. For example, the out-of-coverage WTRU may transmit (e.g., broadcast) a resource allocation pool that it may use to select resources for operation and/or the in-coverage WTRU may be aware of the resource pool according to the pre-configured information. The in-coverage WTRU, for example once it detects an out-of-coverage WTRU, may determine the resource pool the neighboring WTRU is using. The in-coverage WTRU may not receive this information from the out-of-coverage WTRU and/or it may rely on the preconfigured resource pool for the PS it has. The network may be aware of the resource pool pre-configured for the PS WTRUs.

The WTRU (e.g., in-coverage WTRU) may send a report to the eNB, for example, based on one or a combination of the triggers described herein (e.g., upon detection of the need to communicate to as a PS WTRU and/or communicate to a neighboring WTRU). The content of the report may be described herein, for example, the report may include the resource pool that the PS WTRU may be using, recommended time pattern, pre-configured time pattern, etc.

The eNB, for example upon reception of this request, may determine the scheduling opportunities and/or gaps to allocate to the in-coverage WTRU for PS communication and/or discovery and/or may send the gap pattern and/or time pattern and/or resource configuration to the WTRU or approves the use of the requested time pattern.

In the case of idle mode operation, the in-coverage WTRU, for example, based on the discovery resource pool allocated for in-coverage (e.g., time pattern and/or frequency) and/or the paging occasions, may determine a time pattern that may allow the in-coverage WTRU to tune out of the serving eNB and successfully perform communication with the neighboring WTRU.

The in-coverage WTRU may be configured by the eNB with a reception time pattern for communication with other WTRUs (e.g., in-coverage and/or out-of-coverage to the eNB) and/or the in coverage WTRU may have the pattern pre-configured.

The in-coverage WTRU, for example based on the determined pattern (e.g., from the eNB and/or determined internally), may send a message and/or report to the neighboring WTRU. The message may be transmitted as a broadcast message, as a synchronization message, and/or as a dedicated message to the WTRU and/or by using a control message that may be received by WTRUs belonging to the same group. The message and/or report may indicate the resource allocation, time pattern, and/or frequency in which the in-coverage WTRU may transmit and/or receive. The neighboring WTRU may relay and/or transmit (e.g., broadcast) the message and/or pattern to its controlling entity, which for example, may approve and/or configure the neighboring WTRU with the requested pattern and/or may send a new suggested pattern.

The eNB, for example in addition to a gap pattern and/or time pattern, may provide the WTRU with a specific resource configuration (e.g., frequency and/or time, for example by specifying subframe(s) and/or PRB(s)) that the out-of-coverage WTRU may transmit and/or receive with in-coverage WTRU, where for example, the frequency may correspond to the in-coverage resource pool. The out-of-coverage WTRU may be a standalone unattached out-of-coverage WTRU that may be trying to connect to the network using the in-coverage WTRU as a WTRU-to-NW (network) relay. The out-of-coverage WTRU may be communicating with other in-coverage and/or out-of-coverage WTRUs.

Interactions between an in-coverage WTRU and an out-of-coverage WTRU may be provided. When the WTRU begins to operate in the relay and/or PS mode, the WTRU may send one or more D2D synchronization signals (D2DSS) and/or a control message (e.g., synchronization message). The WTRU may advertise that it is capable of operating as a relay and/or PS node in the control message. A neighboring WTRU operating in vicinity which is looking for a coordinating entity may monitor (e.g., periodically monitor) for D2DSS control symbols and/or may detect the WTRU (e.g., in coverage WTRU, out of coverage WTRU, relay WTRU, and/or the like). The triggers for a WTRU to begin operating as a relay node may be based on pre-configuration, based on measurements, based on explicit trigger from the network and/or from the ProSe server, and/or the like.

The in-coverage WTRU may send resource pool information, obtains acknowledgements, send a report to the eNB, and/or the like. The WTRU operating as a relay and/or triggered to operate as a PS node may operate in an unsolicited mode. For example, the WTRU may advertise itself as a relay and/or a PS node. The WTRU may send an advertisement message with one or more ProSe parameters (e.g., ProSe WTRU id, security, ProSe group id, etc.) and/or the resource pool it may be using for a link with the out-of-coverage WTRU and/or other PS nodes. The WTRU may operate as a cluster-head and/or append this information as a part of cluster configuration message, for example, for the synchronization message. This may be used by the WTRU to support open discovery. The control message may carry resource configuration provided by the eNB.

The out-of-coverage WTRU may send a response accepting the configuration parameters. The response message may indicate one or more (e.g., a subset) of the resources in the pool that are acceptable to the out-of-coverage WTRU. The relay and/or the PS node WTRU may send a report to the eNB with this information, for example, as described herein. The eNB may accept this configuration. The eNB may configure gaps and/or reconfigure resources for the relay WTRU and/or PS node to be able to operate with the out-of-coverage WTRU and/or PS node using gaps.

Resources may be used for relaying a control message (e.g., synchronization message). A WTRU operating as a relay may request for resources to relay the control message. The WTRU operating as a relay may use semi-statically allocated resources signaled by the eNB (e.g., using SIB signaling) to relay the control message. The WTRU operating as a relay may use preconfigured resources to relay the control message. The resources may be explicitly preconfigured for a control message and/or the WTRU may select (e.g., autonomously select) resources from a resource pool to be used for relaying the control message.

The out-of-coverage WTRU may request resource pool information, obtain information, send a report to the eNB, and/or the like. The remote and/or PS node WTRU may send a solicitation message requesting any neighboring WTRUs that can operate in a relay and/or PS mode. The WTRU may operate as a cluster-head. The WTRU may include the resource pool it expects to use for transmission and/or reception and/or is using in the cluster configuration message, for example, for the synchronization message. A WTRU (e.g., with capability to operate in relay and/or PS mode, and/or operating in solicited mode) may detect this node and/or respond by declaring itself as a relay and/or PS node. The response message may indicate the parameters identifying itself as a ProSe node (e.g., ProSe WTRU id, ProSe group id, etc.), security configuration, and/or the like. The responding WTRU may request a different resource pool, for example, based on capabilities and/or an existing gap pattern configuration.

The relay and/or the PS node WTRU may send a report to the eNB with this information (e.g., as described herein), for example, once the resource negotiation is concluded. This mode may support targeted discovery. The eNB may accept the configuration and/or configure gaps and/or reconfigure resources for the relay WTRU and/or PS node to be able to operate with the out-of-coverage WTRU and/or PS node using gaps.

Methods to coordinate a communication from a coordinating WTRU may be provided. The WTRU may send a report. The WTRU may identify one or more (e.g., all) of the resources in the report. A reporting mechanism, a WTRU, and/or a WTRU transmitting a message may be used to allow coordination of time and/or resources used by WTRUs in coverage of different cells and/or clusters controlled by uncoordinated entities. Reporting may include resource allocation for an out-of-coverage link to assist the controlling entity and/or transmitting entity to determine scheduling opportunities and/or resource allocation. Resource allocation information may include information relayed, transmitted, broadcasted by neighboring WTRUs, and/or available (e.g., configured or preconfigured) in the in-coverage WTRU.

Reporting (e.g., which may include format, triggers, time windows, and/or the like) may be configured by the network (e.g., by a network node such as an eNB). The network node may configure one or more WTRUs that are configured to operate in a certain D2D communication mode. The reception of this report by the network may trigger actions.

The report may be transmitted to a coordinating entity and/or may be transmitted in the form of a broadcast message, as a part of a synchronization message, as a dedicated message by the coordinating (e.g., in-coverage) WTRU, and/or the like.

The report and/or the transmitted message triggered by a WTRU may include resource configuration from neighboring WTRUs. For example, the report may indicate the resource pool information obtained from the neighboring entities (e.g., WTRUs, cluster heads and/or eNBs, and/or out-of-coverage WTRUs).

The reported configuration may include the resource set intended for D2D discovery (e.g., frequencies, bandwidth, subframe(s), PRB(s), time, and/or the like), the resource set intended for D2D communications (e.g., frequency, bandwidth, subframe(s), PRB(s), time, and/or the like), and/or the identity of the coordinating entity and/or of the WTRU providing configuration information (e.g., cluster head id, eNB id and/or WTRU id, group ID, Prose ID, and/or the like).

The report triggered by a WTRU may include resources (e.g., a sub-set of resources) within a resource pool or the resource pattern that the in-coverage WTRU requests from the eNB (e.g., or may use as previously received from the eNB and/or already configured in the WTRU), for example, such that it may communicate with the out-of-coverage WTRU. For example, the report may include a suggested and/or used time pattern (e.g., cycle, duration, etc.), frequency, and/or the like. The report may indicate a controlling entity that may be taken into account and/or grant to the reporting WTRU. The suggested time pattern may be received from the neighboring WTRU and/or determined (e.g., autonomously) by the in-coverage WTRU based on information it has available. For example, the report may include one or more indices describing the resource(s) (e.g., in time and/or frequency) within a resource pool which the out-of-coverage WTRU and in-coverage WTRU have negotiated and/or preconfigured to use for the out-of-network link.

The report triggered by a WTRU may include location information. Location information may be associated with the reporting WTRU and/or may be associated to the report. A WTRU (e.g., transmitting and/or receiving) may determine its location, for example, based on the cell ID, GPS information, and/or other location information, and append the location information to the report.

The report triggered by a WTRU may include identity information. Identity information may include the identity of the detected out-of-coverage WTRU and/or the identity of the WTRU transmitting the message (e.g., on the synchronization channel). The identity may include a WTRU specific ID, a ProSe ID, a ProSe Group ID, a ProSe Application ID, and/or the like. The report triggered may include information related to one or more service (e.g., one or more service identities) for the detected out-of-coverage WTRU and/or for the WTRU transmitting the message. This information may be used, for example, to establish a relay service.

The report may include the specific plurality of resources, sub-frames and/or duration over which it may expect to receive data and/or receive data (e.g., as determined by control message, scheduling assignment, broadcast message, etc.)

The report triggered by a WTRU may include information relating to whether an out-of-coverage WTRU is present and/or absent. An indication when the in-coverage WTRU detected an out-of-coverage WTRU requesting and/or providing PS service, an indication when the in-coverage WTRU stops detecting the out-of-coverage WTRU (e.g., using measurements), and/or an indication when the out-of-coverage WTRU stops requesting relay service and/or when the WTRU detects a D2DSS from a neighboring WTRU, may be included in the report.

SFN (system frame number) and/or a timer reference may be used.

The report triggered by a WTRU may include information relating to the reason for triggering the transmission of the report, the request, and/or the transmission message (e.g., over a synchronization message). The reasons to trigger a report may include a request to initiate ProSe discovery and/or communication for devices that may be operating in another frequency, detection of a neighboring WTRU to initiate communication with, a neighboring WTRU is no longer available, a new WTRU is detected, a change of pattern and/or configuration request, a request to stop a ProSe service, and/or the like.

Triggers may be provided. The WTRU may trigger a report, a request for a pattern, and/or the transmission of a pattern (e.g., over a synchronization message) based on the configuration. The WTRU may initiate the transmission when it receives L3 signaling that requests the WTRU to initiate a report and/or message transmission, and/or when the WTRU is configured for such reporting and another trigger initiates transmission of the report. Signaling may be specific to a D2D and/or prose service (e.g., communication and/or discovery) and/or may be WTRU-specific (e.g., applicable to any identities).

Triggers for the report may be event-based. For example, the trigger may be based on detection of a neighboring WTRU, a neighboring WTRU leaving, a request to initiate a ProSe service and/or initiate discovery, a change of pattern and/or resource allocation used by neighboring WTRU, and/or the like.

The report may be triggered when the in-coverage WTRU detects an out-of-coverage WTRU. The WTRU may detect the neighboring WTRU based on a received D2DSS, a synchronization message, and/or data received from the neighboring WTRU requesting a connection (e.g., solicited and/or unsolicited mode) and/or a WTRU performing PS communication with which the in-coverage WTRU can communicate with (e.g., the WTRUs belong to the same group and/or is allowed to communicate according to the ProSe configurations). The report may be triggered when an in-coverage WTRU detects the out-of-coverage WTRU is no longer available and/or the out-of-coverage WTRU is no longer requesting the service.

The WTRU may trigger a request and/or report when an application request from a server to initiate a ProSe service is received. The request and/or a pattern request and/or report from an in-coverage WTRU may be to enable the WTRU to detect and/or discover an out-of-coverage WTRU. The network may configure the WTRU for additional reporting, for example, once the neighboring WTRU has been detected and/or report to the network a request for opportunities to communicate with the discovered WTRU. The WTRU may trigger a report when it determines that a neighboring WTRU has changed the pattern and/or the resource allocation.

Triggers may be based on measurements and/or other detected WTRUs. The WTRU may trigger a report, a request for a pattern, and/or the transmission of a pattern (e.g., over a synchronization message) when connected to a higher priority synchronization source and/or when the WTRU detects another WTRU transmitting a synchronization originating from a lower priority source synch (e.g., a first WTRU is connected to an eNB and detects a second WTRU that is sending a synch signal and is connected to another WTRU and/or another synch source). A trigger may be when the WTRU detects a second WTRU which is not connected to an eNB. A trigger may be when the WTRU detects a second WTRU operating on a frequency other than its frequency of operation. A trigger may be when the WTRU detects a second WTRU that belongs to the same group (e.g., the second WTRU is allowed to communicate with the first WTRU). A trigger may be when the WTRU receives data from a second WTRU and determines that the WTRU is not in the coverage of the eNB (e.g., this may use an indication in the SA that the WTRU is not in coverage if there is not a D2DSS, SCI, SSS, other control signal and/or a message). A trigger may be when the WTRU detects different transmission patterns from different synchronization sources.

Triggers for the report may be periodic. The WTRU may initiate reporting periodically, for example, if (e.g., only if) there is one or more (e.g., possibly configurable number of) transmissions applicable to the reporting period. The reporting may be stopped when the WTRU detects that the out-of-coverage WTRU is no longer available (e.g., based on measurement) and/or the out-of-coverage WTRU stops requesting the service.

Triggers for the report may be aperiodic. The WTRU may initiate reporting from the reception of control signaling that requests that the WTRU perform reporting. Signaling may be received from a network node and/or may be dedicated signaling and/or signaling applicable to a plurality of WTRUs (e.g., received on a broadcasting channel and/or on a common control channel).

The WTRU may transmit the report using L2 (e.g., MAC) signaling (e.g., as a MAC Control Element), as L3 (e.g., RRC) signaling (e.g., as a RRC PDU as part of a reporting procedure), and/or as higher layer signaling (e.g., such as NAS signaling and/or application signaling). For example, the WTRU may receive control signaling on the PDCCH (e.g., an aperiodic request) that may trigger such reporting. The WTRU may assemble the report as a MAC control element and/or include it in an uplink transmission (e.g., its next uplink transmission). The eNB may be the endpoint of the reporting procedure.

The WTRU may receive a request on a signaling radio bearer (SRB) as an RRC PDU that triggers such reporting. The WTRU may assemble the report as a RRC PDU and/or make it available for transmission on the concerned SRB.

The WTRU may trigger reporting at the application level. For example, the WTRU may assemble an application layer control packet and/or make it available for transmission, for example, as a RRC PDU and make it available for transmission on the concerned SRB (e.g., in case NAS is used) and/or as a user plane data and make it available for transmission for a corresponding DRB. The ProSe and/or the application server may be the endpoint of the reporting procedure.

The WTRU may trigger reporting. If the WTRU is in RRC IDLE mode, the WTRU may initiate a transition to CONNECTED mode and/or transmit the report according to the applicable signaling method. The WTRU may remain in IDLE mode and/or delay the transmission of the report until it moves to CONNECTED mode, for example, if RRC and/or a higher layer protocol is used.

One or more of the following actions may be performed upon reception of a report. The network and/or controlling node that receives a report may analyze the resource pool information and perform one or more of the following, for example, from reports received from multiple sources. The network and/or controlling node may determine which resource it may allow the in-coverage WTRU to communicate within the resource pool. The network and/or controlling node may initiate a procedure that reconfigures the resources for one or more WTRUs. The network and/or controlling node may use this information to avoid scheduling the WTRUs in the given resources and/or time periods. For example, the eNB may determine a gap pattern for the in-coverage WTRU and configure the WTRU with the gap pattern.

Upon receiving a report, the eNB may determine, provide, and/or configure a gap and/or time pattern for the WTRU. The gap pattern may be a bitmask and may indicate the TTIs when the WTRU may not be scheduled for normal communications and/or the pattern may correspond to a period, cycle, and/or duration within a period (e.g., each period) the WTRU may not be scheduled for communication with the eNB. Upon receiving a report, the eNB may analyze the requested gap pattern and if it is not deemed efficient, the eNB may provide the WTRU with a new gap pattern.

The WTRU may use the gap pattern to switch to the out-of-coverage link with the neighboring WTRU. The WTRU may send the gap pattern to the out-of-coverage WTRU and/or the new gap pattern received from the eNB to the out-of-coverage WTRU.

The eNB may remove the gap configuration, for example, when the report includes an indication informing the eNB that the out-of-coverage WTRU is no available and/or no longer requesting the service.

Network resource management may be provided. The network may allocate an amount of resources for D2D discovery WTRUs. If a neighbor eNB shares the same resources, the chance that two D2D WTRUs in proximity use the same resource to transmit discovery signal may be high, for example, since there may be limited resources. With proper resource management by the network, interference and/or collisions may be avoided and/or mitigated through coordination between eNBs and/or centralized control of discovery resources. The network may manage resource management by, for example, determining which resources may be allocated, to which D2D WTRU the resources may be allocated, and/or how the WTRU determines the resources to select to transmit (e.g., to transmit a discovery signal or a D2D communication).

D2D WTRUs may select resources for transmitting a discovery signal (e.g., D2D message). The monitoring D2D WTRUs may monitor the resources (e.g., all the resources) for discovery, for example, as allocated by the network. There may be more than one type of discovery, for example, which may be based on network allocation of resources to the WTRU. The network may allocate resources to one or more D2D WTRUs on a non-WTRU specific manner. For example, a WTRU (e.g., each WTRU) may select the resource to transmit from a set of resources (e.g., a resource pool) allocated by network. The network may allocate resources to one or more D2D WTRUs on a WTRU specific manner. For example, a WTRU (e.g., each WTRU) may be scheduled with dedicated resources to transmit a discovery signal.

The resources may be defined as a set of PRBs and/or subframes which may be used for discovery. D2D WTRUs under the same eNB may not create interference to each other since the network may schedule the resource for each WTRU without any collision (e.g., as in Type 2 D2D discovery). Without any coordination and/or central control of neighbor eNBs, collisions may occur at the border of two eNB areas. The network may not have any knowledge about the resources used by each D2D WTRU for transmission. Without proper allocation of resources, there may be many collisions within the same eNB area and/or the WTRU under an eNB may cause interference to other WTRUs under neighbor eNBs.

A WTRU at cell center may refer to a WTRU that is close to the center of the cell to which it is associated (e.g., distance between WTRU and eNB may be less than a threshold). A WTRU at cell edge may refer to a WTRU that is close to the edge of the cell to which it is associated (e.g., distance between WTRU and eNB may be greater than a threshold). The WTRU may be associated to a cell, for example, if the cell is the WTRU's serving cell (e.g., when the WTRU is in Connected Mode), if the cell is the closest cell (e.g., in terms of signal strength, for example indicated by RSRP) to the WTRU, and/or if the cell is the cell that the WTRU camps on (e.g., in Idle Mode).

A WTRU may be configured when it is located at cell center, for example, by measuring the signal from one or more eNBs. For example, a WTRU may be configured to determine that it is at cell center by comparing the measured RSRP value of its associated cell to a threshold. If the measured RSRP value is above a threshold (e.g., the signal power is above a threshold), the WTRU may determine that it is located at or near cell center. A WTRU may determine that it is at cell center by comparing the measured RSRP value of its associated cell (e.g., primary cell) to a measured RSRP value of one or more cells (e.g., cell(s) adjacent to the primary cell). The WTRU may determine that it is located at cell center, for example, if it determines that the RSRP value of its associated cell (e.g., primary cell) is larger than a value (e.g., preconfigured value), for example, of RSRP measurements from one or more cells (e.g., adjacent cell(s)). For example, the WTRU may use hysteresis (e.g., and/or time to trigger, make measurement for a period of time, and/or the like) in determining whether or not it is at cell center, for example, to avoid an undesirable ping-pong effect. A WTRU at cell edge may refer to a WTRU which is close to the edge of the cell to which it is associated. Methods similar to those described for determining whether or not a WTRU is at cell center may be used by a WTRU to determine whether or not it is at cell-edge. For example, a WTRU may determine that it is located at cell edge if it determines that the RSRP value of its associated cell is smaller than a value (e.g., preconfigured value).

A D2D WTRU may be allocated with a set of resources (e.g., resource pool) to transmit a discovery signal. The WTRU may use one or more resources to start transmitting. If the network fully schedules the WTRU with the resources for transmission, then the interference caused by collisions may be avoided through resource orthogonalization, which for example, may mean that the WTRU may use its own dedicated resources to transmit and/or the resources may not overlapped in time and/or frequency. If the WTRU is allocated (e.g., only allocated) with a set of resources for transmission and/or the WTRU selects the resources autonomously, two or more D2D WTRUs in proximity may select the same resource for transmission, which for example, may cause collisions and/or interference. In this case, the network may not know that the collisions and/or interference are occurring.

One or more of the following may be performed, for example, to minimize the chance that two D2D WTRUs in proximity select the same resource for transmission.

The network (e.g., an eNB) may allocate resources for one or more D2D WTRUs to select for transmission. The eNBs may share the same resources and/or an eNB (e.g., each eNB) may use a set of different resources, for example, for type 1 or mode 2 (e.g., WTRU selected) resource allocation. An eNB may allocate resources (e.g., a subset of resources) based on the WTRU location and/or measurements (e.g., cell center, cell edge, etc.), resource utilization in an area, prose application priority, discovery process characteristics and/or configuration, and/or the like.

Figure 10:
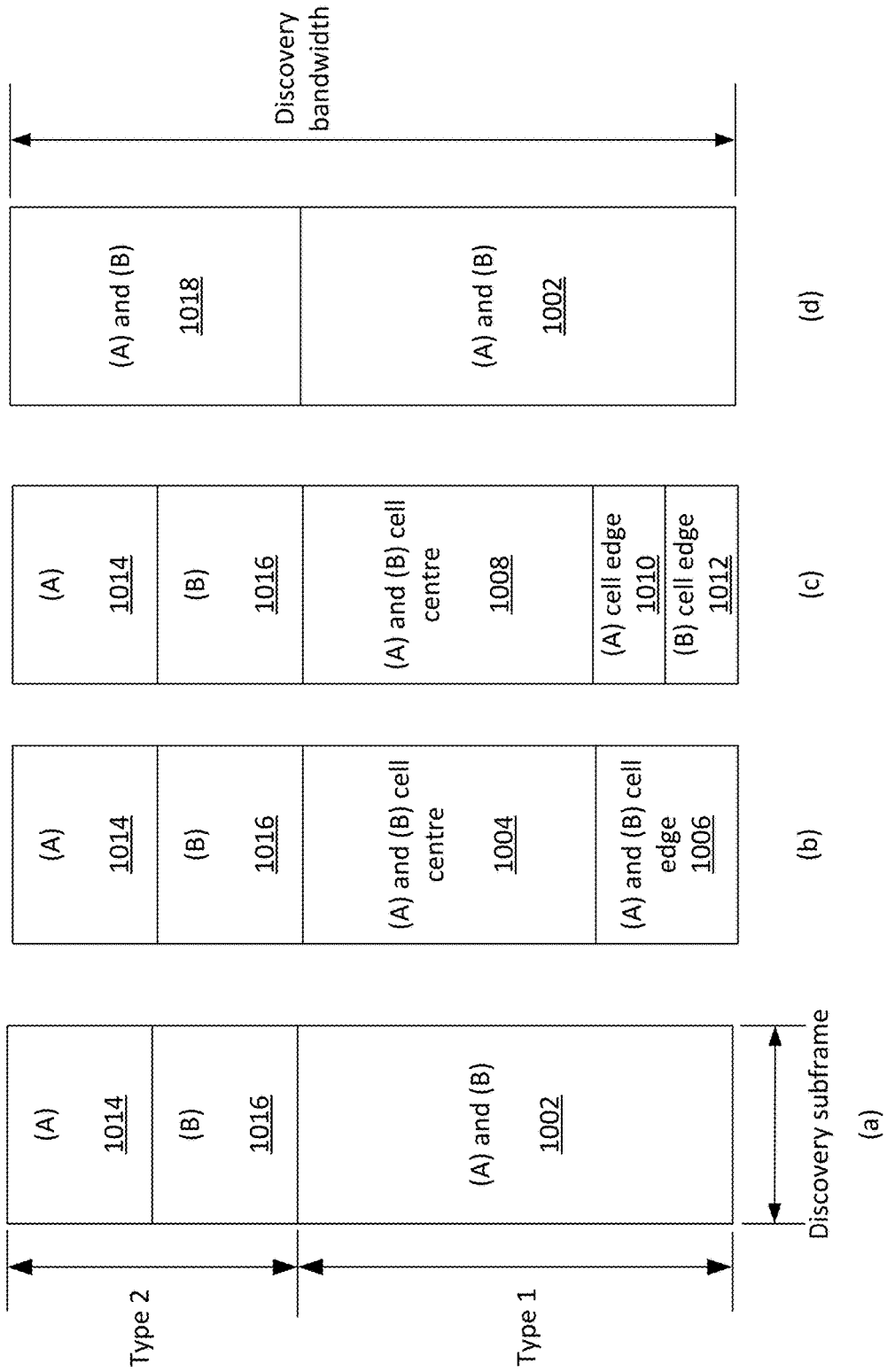
FIG. 10 is a diagram of an example of resource allocation of discovery resources across two eNBs, eNB A and eNB B.

FIG. 10 is a diagram of an example of resource allocation of resources (e.g., discovery) across two eNBs, eNB A and eNB B. Type 1 discovery may refer to when the network allocates resources to D2D WTRUs on a non-WTRU specific manner, for example, such that a WTRU (e.g., each WTRU) may select the resource to transmit from a set of resources (e.g., from a resource pool) allocated by network. Type 2 discovery may refer to when the network allocates resources to D2D WTRUs on a WTRU specific manner, for example, such that a WTRU (e.g., each WTRU) may be scheduled with dedicated resources to transmit a discovery signal. In FIG. 10, (A) may be used to denote a first eNB, eNB (A), and (B) may be used to denote a second eNB, eNB (B).

Type 1 and type 2 discovery may use different sets of resources and/or the allocation of resources for type 2 discovery may be taken from the same resource pool as used for type 1 discovery, for example, as shown in example (a) of FIG. 10. For type 1 discovery, eNBs may share the same set of resources for discovery signal transmission. For example, eNB (A) and eNB (B) may use resource pools 1002 for type 1 D2D transmission. For type 1 discovery, eNBs may allocate different sets of resources for WTRUs at the cell center and WTRUs at the cell edge, for example, as shown in the example (b) of FIG. 10. For example, eNBs A and B may allocate the same set of resources for WTRUs in the cell center (e.g., resource pools 1004), and a different set of resources for cell edge WTRUs (e.g., resource pools 1006). The set of resources (e.g., resource pools) used for cell edge WTRUs may be the same across the different eNBs, for example as illustrated in example (b) of FIG. 10.

An eNB (e.g., each eNB, for example, eNB A and eNB B) may allocate different resource sets for WTRUs at the cell center and at the cell edge, for example, as shown in the example (c) of FIG. 10. For example, different eNBs (e.g., eNB A and eNB B) may share the same set of resources for the cell center WTRUs. Different eNBs (e.g., eNB A and eNB B) may allocate different resource sets for cell edge WTRUs. For example, eNBs (A) and (B) may use resource pools 1008 at their cell centers. eNB (A) may use resource pools 1010 at its cell edge. eNB (B) may use resource pools 1012 at its cell edge. eNB (A) and eNB (B) may use different resource at their cell edges, for example to avoid interference.

eNB (A) and eNB (B) may use the same resource pools 1002 for type 1 communication, for example as shown in example (d) of FIG. 10. eNB (A) and eNB (B) may use different resource pools for type 2 communication. For example, eNB (A) may use resource pools 1014 and eNB (B) may use resource pools 1016 for type 2 communication, as exemplified in examples (a), (b) and (c) of FIG. 10. eNB (A) and eNB (B) may use the same resource pools 1018 for type 2 communication, as illustrated in example (d) of FIG. 10.

The eNB may allocate a different set of resources for different application priorities. For example, a different set may be available for WTRUs transmitting a signal from a higher priority application and/or another set of resources may be available for transmission from a lower priority application. The priority of the applications may be configured by the network, a ProSe server, and/or may be preconfigured. The discovery process characteristics may be configured by the network, the ProSe server, and/or may be preconfigured. Discovery process characteristics may refer to, for example, the type of discovery process, the type of application (e.g., public safety or commercial), the type of method (e.g., open/restricted discovery), the type of QoS characteristics, latency of transmission, rate of transmissions or message generation, and/or the like.

An eNB may achieve resource coordination. To allow the network to allocate different sets of resources to D2D WTRUs, coordination across different eNBs may be provided and/or a centralized coordinator may be in charge of the resource management between different eNBs.

Inter-eNB coordination of resources may be provided. The different eNBs may exchange the sets of resources allocated to D2D WTRUs, for example, via the X2 interface. For example, one eNB may send an X2 signal to a neighbor eNB(s), which may indicate a set of resources allocated for its D2D WTRUs (e.g., resources at the cell center and/or resources for D2D WTRUs at the cell edge). The neighbor eNB(s) may allocate resource sets to its D2D WTRUs based on this information. For example, the neighbor eNB(s) may share the same set of resources for D2D WTRUs at cell center, and/or may use different sets of resources for WTRUs at cell edge, for example, as shown in the example (c) of FIG. 10.

Different eNBs may exchange the resource information, for example, if the sets of resources allocated remain the same during a period. If the eNB changes the resources allocated to WTRUs, the eNB may send such information to its neighbor eNBs. Neighbor eNBs may adjust the resources to allocate, for example, when an eNB receives a report from the WTRU and/or determines that more resources will be allocated. The eNB may inform the neighbor eNBs of such changes.

Centralized resource management may be provided. Neighbor eNBs in one area may be connected to a central node. The centralized node may control the resource management among one or more neighbor eNBs. The centralized node may allocate an eNB with the proper sets of resources (e.g., a plurality of resource pools). For example, the centralized node may allocate adjacent eNBs with the same set of resources for the D2D WTRUs at the cell center and different sets of resources for D2D WTRUs at the cell edge, for example, as shown in the example (c) of FIG. 10.

eNB A and eNB B may be assigned a first resource pool 1008 to use at or near the center of their respective cells, for example, as illustrated in example (c) of FIG. 10. The eNB A and eNB B may use the first resource pool 1008 concurrently at their cell centers without causing significant interference because a distance between the cell centers may be greater than a threshold distance in which reuse causes interference. eNB A and eNB B may be assigned different resource pools to use at or near their cells edges, for example, as illustrated in example (c) of FIG. 10. For example, eNB A may be assigned a second resource pool 1010 and eNB B may be assigned a third resource pool 1012. eNB A and eNB B may not use the same resource pool at their cell edges because their cell edges may overlap or a distance between their cell edges may be less than a threshold distance in which reuse causes interference.

One or more WTRUs may select a set of resources (e.g., a resource pool) to use for D2D communication (e.g., transmission or reception). A WTRU being served by eNB A may select a resource pool from a plurality of resource pools to send information using D2D communication, for example, as illustrated in example (c) of FIG. 10. A WTRU being served by eNB A may select the first resource pool 1008, for example when the WTRU is at or near the center of the cell being served by eNB A. A WTRU being served by eNB A may select the second resource pool 1010, for example when the WTRU is at or near the edge of the cell being served by eNB A. A WTRU being served by eNB B may select the first resource pool 1008, for example when the WTRU is at or near the center of the cell being served by eNB B. An example of this is illustrated in example (c) of FIG. 10. A WTRU being served by eNB B may select the third resource pool 1012, for example when the WTRU is at or near the edge of the cell being served by eNB B.

The set of resources to be used by a WTRU for transmission may be autonomously determined by the WTRU and/or explicitly configured by the network, for example, based on one or more criteria. The resource set selection criteria may be a function of one or more of the following measurements and/or criteria determined by the transmitting WTRU.

The resource selection (e.g., resource pool selection) may be based on RSRP measurement(s). The RSRP measurement of the serving cell, the eNB in which the WTRU is camped in idle mode, and/or the RSRP from a neighboring eNB may be used for resource selection. For example, a WTRU being served by eNB A may determine a RSRP measurement and select a resource pool from a plurality of resource pools based on the RSRP measurement.

A WTRU may determine a RSRP measurement of the serving cell. The WTRU may compare the measured RSRP of the serving eNB to a threshold (e.g., preconfigured threshold). For example, if the measured RSRP is larger than a threshold, the WTRU may select from the set of the corresponding resources (e.g., resources configured for WTRUs that have an RSRP larger than a threshold). If the measured RSRP is less than the threshold, the WTRU may select from the other set of resources that are for WTRUs with RSRP smaller than the threshold. For example, a WTRU being served by eNB A may determine a RSRP measurement of a cell being served by the eNB A. The WTRU may select the first resource pool 1008, for example when the RSRP measurement is greater than a threshold.

The WTRU may select the second resource pool 1010, for example when the RSRP measurement is less than the threshold.

A WTRU may use a RSRP measurement from a neighboring eNB to select a resource pool. For example, a WTRU being served by eNB A may use a RSRP measurement of a cell that is being served by eNB B (e.g., a neighboring cell, for example an adjacent cell). The WTRU may determine that it is proximate to a neighboring cell when the RSRP measurement of the neighboring cell is above a threshold. A WTRU being served by eNB A may select the second resource pool 1010, for example when the RSRP measurement of a neighboring cell (e.g., a cell being served by a neighboring eNB, eNB B) is above a threshold. The WTRU may determine that it is distal from a neighboring cell when the RSRP measurement of the neighboring cell is below a threshold. A WTRU being served by eNB A may select the first resource pool 1008, for example when the RSRP measurement of a neighboring cell (e.g., cell being served by eNB B) is below a threshold.

Different resource sets (e.g., resource pools) may be configured to be used for different RSRP ranges. For example, the first resource pool 1008 may be associated with a first range of RSRP values and the second resource pool 1010 may be associated with a second range of RSRP values. The first range of RSRP values may include RSRP values above a threshold and the second range of RSRP values may include RSRP values below the threshold. A WTRU may select the first resource pool 1008, for example when the RSRP measurement is within the first range of RSRP values. The WTRU may select the second resource pool 1010, for example when the RSRP measurement is within the second range of RSRP values. A range of RSRP values may include a low RSRP threshold that indicates a lower limit of the range and a high RSRP threshold that indicates a higher limit of the range. A WTRU may determine that a RSRP measurement is within the range of RSRP values when the RSRP measurement is between the low RSRP threshold and the high RSRP threshold (e.g., greater than the low RSRP threshold and less than the high RSRP threshold). A range of RSRP values may be open-ended. For example, a RSRP range may have one (e.g., only one) limit, (e.g., only a lower limit or only a higher limit). A RSRP threshold may be a low RSRP threshold of an open-ended range of RSRP values or a high RSRP threshold of the open-ended range of RSRP values.

The WTRU may report the measurements (e.g., a RSRP measurement) based on a triggering criteria to the serving eNB (e.g., eNB A). The eNB may configure and/or indicate the WTRU with the set of resources. For example, the eNB may indicate to the WTRU that the first resource pool 1008 is associated with a first range of RSRP values and the second resource pool 1010 is associated with a second range of RSRP values. The eNB may indicate the resource pool(s), RSRP range(s) and/or RSRP threshold(s) via radio resource control (RRC) signaling. For example, the eNB may send a configuration to the WTRU. The configuration may identify the resource pool(s), RSRP range(s) and/or RSRP threshold(s).

The WTRU may compare RSRP from its serving eNB and/or one or more neighbor eNBs. For example, a WTRU being served by eNB A may compare RSRP measurements of the cells being served by eNB A and eNB B. The network may configure two or more sets of resources for D2D WTRUs in the center of eNB area and in the edge of the eNB area. For example, eNB A may determine that the first resource pool 1008 be used at or near cell center and the second resource pool 1010 be used at or near cell edge.

The WTRU may determine which set of resources (e.g., which resource pool to select from a plurality of resource pools) to select as a function of the RSRP of the serving eNB and/or one or more neighboring eNBs. For example, a WTRU being served by eNB A may select one of the first resource pool 1008 or the second resource pool 1010 based on a RSRP measurement. For example, the WTRU may select resource pool 1010 (e.g., the resources for cell center) when the measured RSRP of the serving eNB (e.g., eNB A) is larger than the RSRP of one or more neighboring eNBs (e.g., eNB B), for example, by a certain value and/or for a period of time. For example, the WTRU may select the first resource pool 1008 when a difference between the measured RSRPs of eNB A and eNB B exceeds a threshold. Otherwise, the WTRU may select from the other set of resources (e.g., second resource pool 1010). For example, the WTRU may select the second resource pool 1010 when the difference between the measured RSRPs of eNB A and eNB B is below a threshold.

The WTRU may report the criteria to the serving eNB (e.g., eNB A). For example, the WTRU may send a RSRP measurement to eNB A. The eNB may configure the WTRU with the set of resources to select. For example, the eNB A may configure the WTRU to select a resource pool by sending a configuration to the WTRU. The configuration may indicate a resource pool that the WTRU may use based on the RSRP measurement. For example, WTRU may report '1' if the RSRP from the serving eNB (e.g., eNB A) is larger than that from one or more neighbor eNBs (e.g., eNB B), for example, by a value and/or for a period of time, and the WTRU may report '0' otherwise. An eNB (e.g., eNB A) may configure a WTRU to select a cell center resource pool (e.g., first resource pool 1008) when the WTRU reports '1'. An eNB (e.g., eNB B) may configure a WTRU to select a cell edge resource pool (e.g., second resource pool 1010) when the WTRU reports '0'.

The resource selection may be based on the path loss to the serving eNB and/or to one or more of the neighboring eNBs. The WTRU may compare the measured path loss to the serving eNB to a threshold (e.g., a predefined threshold), for example, similar to RSRP measurements. The WTRU may select the set of resources to choose from based on the comparison result and/or the WTRU may compare the path loss to the serving eNB and/or one or more neighbor eNBs. The WTRU may select from the set of resources for cell center WTRUs (e.g., first resource pool 1002) if the path loss to serving eNB (e.g., eNB A) is less than that to one or more neighbor eNBs (e.g., eNB B). Otherwise, the WTRU may select from the set of resources for cell edge WTRUs (e.g., second resource pool 1010). The WTRU may report the measurement to the eNB based on a triggering criteria. The eNB may configure the resource set to use.

The resource selection may be based on the timing advance value to the serving eNB and/or to the neighboring eNBs. For WTRUs in connected mode, the timing advance value to its serving eNB and/or one or more neighbor eNBs may be used as a criteria to select the resource set. For example, if the timing advance value in the serving eNB is less than a threshold, the WTRU may select the corresponding configured resource (e.g., when the given criteria is met). Otherwise, the WTRU may select from another set of resources. The WTRU may report to the eNB based on the comparison results of one or more timing advance values.

The resource selection may be based on the measured energy level on one or more (e.g., a sub-set) of allowed discovery resources. The WTRU may determine the set of resources to select from and/or may report to the eNB based on the measured resource utilization on one or more (e.g., a subset) of discovery resources. Resource utilization may be determined, for example, by measuring the amount of energy and/or by monitoring control signaling and/or discovery signaling in the resources of interest, for example, as described herein.

The WTRU may perform measurements (e.g., energy level on the resources within a set) on one or more sets of resources and use the results of the measurements to determine which resource set to use. The WTRU may select the resource set in which the measured resource utilization is the lowest (e.g., the lowest energy level was detected across the resources (e.g., all resources) in the set over one measurement and/or over a number of measurements). Resource selection (e.g., initial resource selection) may be performed based on such measurements and/or the WTRU may randomly select a resource across the available resource sets (e.g., from a plurality of resources in a resource pool). Resource selection (e.g., initial resource selection) may be based on a network configured priority order and/or based on other measurements, for example, as described herein. Once a resource selection (e.g., an initial resource selection) is performed, the WTRU may change a resource set, for example, if the measured energy level across resources (e.g., all the resources) is higher than a threshold, for example, for a period of time. The WTRU may select a resource set (e.g., a new resource set) based on the measured energy in another set of resource. For example, the WTRU may select the resource set with the lowest energy level, the WTRU may randomly select a resource set, and/or the WTRU may select the next highest priority set of resources. The WTRU may select a set of resources if another set of resources has a lower average resource utilization across its resources, for example, by a threshold and/or for a period of time. If the resources are occupied on one or more (e.g., all) resource sets, the WTRU may send a report to the network.

The resource selection may depend on the priority of the application. The WTRU may be configured with a priority (e.g., a Prose application priority). One or more resource sets may be configured with one or more associated application priority classes. The WTRU may determine which resource set to use based on the priority of the application for which a discovery signal is being transmitted. The WTRU may select the resources with the highest available priority that are equal to or lower than the configured application priority.

The resource selection may depend on one or a combination of the configured characteristics of a ProSe application (e.g., for discovery and/or for communication). For example, resource selection may depend on the type of application, use of application, public safety or commercial, QoS characteristics (e.g., latency, rate, etc.), power characteristics/requirements, type of discovery (e.g., open/restricted) or Model A vs. Mode B discovery, type of communication (e.g., unicast, multicast, or groupcast), etc.

The resource selection for communication may be performed to select one amongst the multiple configured SA resource pools or data transmission pools.

The WTRU may be configured with one or a combination of characteristics. Each resource pool may be configured with one or a combination of characteristics. The WTRU may select a resource set or a set of resources that are configured with the same characteristic as the ProSe application in the WTRU. For example, if the WTRU is configured with a public safety type of application, the WTRU may select the set of resources that are configured for public safety.

The WTRU may select a resource set that meets the power class requirement and/or characteristic of the given application or set of applications. The WTRU may select a resource set from the available resources that is configured with the type of discovery associated to the given application. The WTRU may select from a resource set that allows the WTRU to meet one or more of the QoS criteria, including for example, latency and/or rates. From the configured set of resource, the WTRU may determine the resource set that has the periodicity and/or number of D2D available subframes for D2D transmissions that would allow the WTRU to meet the requirements and/or rates.

The WTRU may select from a resource set that allows the WTRU to meet one or more QoS criteria, including for example, a guaranteed bit rate. For example, the WTRU may determine the resource set that is configured to support a configured PBR or GBR of the logical channel assigned to the D2D transmission packet.

Triggers to perform selection of resources (e.g., autonomous selection of resources) and/or to initiate a report to the eNB may be provided. The WTRU may perform resource selection and/or reporting to the network when a discovery and/or communication process is initiated (e.g., the first time when WTRU attempts to select resources to transmit discovery signal), for example, when the WTRU determines to transmit a discovery signal or message for the first time. The WTRU may report the criteria the WTRU has to meet and/or the characteristics of the eNB to the eNB based on the measured results, for example, as described herein.

At the beginning of a (e.g., each) discovery occasion, the WTRU may perform a measurement (e.g., RSRP measurement) and/or use the measurement to select the appropriate resource set (e.g., resource pool). The WTRU may utilize resources from this resource set for the duration of the discovery process and/or for a configured time period.

The WTRU may perform resource selection (e.g., dynamic resources selection) according to one or more of the criteria defined herein, for example, at every transmission. The WTRU may monitor the resource set and/or measurements. If one or more of the conditions described herein are met, the WTRU may change the resource set it uses. The WTRU may trigger a report to the network when the conditions described herein are met, for example, when WTRU measured RSRP of its serving eNB is above the threshold (e.g., for a duration of time) and/or is decreasing as it moves further from the eNB. If the RSRP value drops to under the threshold, the WTRU may send a report to the eNB indicating such changes and/or may change (e.g., autonomously change) the set of used resources.

The WTRU may perform resource selection and/or reporting to the network when the WTRU is configured by the network to send such report, for example, which may be used for the network to decide which set of resources and what characteristics may be allocated to the WTRU.

The WTRU may perform resource selection and/or reporting to the network when the WTRU cannot find an available set of resources to select. For example, if all sets of resources are occupied based on the measured energy level. The WTRU may select a resource set, may be randomly performed across available resource sets, and/or based on a network configured priority order. If the resource set is selected based on a network configured priority order, the network may broadcast a table indicating the priority order of one or more of the resource sets.

Resources may be selected when the application and/or discovery process meets different criteria. A set of resources (e.g., a discovery resource pool, a SA transmission pool for communication, a communication data transmission pool, etc.) may be configured with an index that corresponds to one or a combination of the different criteria that the WTRU is allowed to select from. For example, an explicit mapping between an index and a criteria or combination of criteria may be defined. The WTRU may determine the associated index depending on its configured criteria (e.g., type of application, power range, QoS, priority, bit rate, etc.).

Table 1 is a table that illustrates an example mapping of a three bit index and associated criteria. The set of criteria that define the resource usage may correspond to the type of application and/or power range for which the resource set can be used. A mapping table may be produced for different resource usage definition that combine different set of desirable criteria and/or with a different number of bits for the index number. For example, more bits can be used if the priority criteria is included in the definition of the resource usage.

TABLE 1

Example Mapping of a Three Bit Index and Associated Criteria

| Index number | Description of resource usage |
| --- | --- |
| 000 | Resource set can be used by WTRUs that have a commercial applications |
| 001 | Commercial application and low power range |
| 010 | Commercial application medium power range |
| 011 | Commercial application and high power range |
| 100 | Resource set can used by WTRUs configured or that are transmitting public safety application type |
| 101 | PS and low power range |
| 110 | PS and medium power range |
| 111 | PS and high power range |

The discovery process and/or communication session may be independently configured with the different criteria. The WTRU may determine to which index the set of criteria maps. The WTRU may select the resource set associated to that index. The WTRU may be explicitly configured with an index. If no resources are configured with the given index, the WTRU may determine the next resource set that meets the configured criteria the best.

A discovery process and/or communication session may be associated with more than one desired usage index (e.g., in a priority order). The WTRU may be configured to match the offered usage index to one or more of the desired usage index (e.g., in order of priority). If that does not work, the WTRU may revert to a default resource and/or a resource that is configured for any type of service.

The resource set may be configured with a resource index and with a measurement criteria (e.g., RSRP threshold associated with resource). Each criteria may be independently configured. Priority amongst the criteria may be established A resource set may be configured (e.g., explicitly and/or independently configured) with one or more different criteria. For example, a resource set may indicate whether it is for public safety (PS) use, commercial use, or neither (e.g., resources may be for any application type). In an example criteria, a resource set may be configured with a power range (e.g., low, medium, high, or none). None may imply that all the resources may be used for all power ranges. For example, a resource set may indicate the type of QoS it supports, the packet bit rate (e.g., PBR or GBR) it can support, and/or the like.

The WTRU may select the first resource set(s) associated with a first criteria (e.g., highest priority criteria). The WTRU may use the next criteria, determined based on the order of priority, to select the next set of resources within the first resource set and so on. For example, the WTRU may first select the set of resources associated for use with an application type (e.g., PS or commercial). The WTRU may select resources that meet a set of power range criteria. The WTRU may select the set of resources according to the RSRP measurement and/or resource configuration.

The WTRU may select the set of resources associated with a configured priority level. The WTRU may select the resource sets with the highest priority level that is equal to or lower than the WTRU configured application priority level. The priority level may be a lower priority than the resources allowed to be used according to the RSRP measurement. So the WTRU may select the set(s) of available resources that meet the configured RRSP measurement criteria and then select the resource with the higher priority level that is equal to or lower than the application priority.

If the WTRU is unable to find a resource set with offered usage index that matches the usage index of a given discovery process and/or communication session, the WTRU may be configured with guidelines on using a closest match resource set. For example, if the WTRU is unable to find a resource set for short range discovery, the WTRU may be configured to use resources from a medium range resource set while respecting its maximum power transmission requirement. For example, the WTRU may have rules to select the resource set configured with a packet bit rate equal to or higher than the packet bit rate of the radio bearer (e.g., logical channel) of the transmission packet.

A default pool may be configured that may be used for discovery messages with any required usage index requirements. The WTRU may select the default pool when no other match is found.

WTRU-autonomous resource control may be provided. The transmitting WTRU may determine how many discovery transmissions (e.g., including 0) to perform in a given discovery occasion and/or time period. By configuring the WTRU discovery transmission rate, the network and/or system may adjust the amount of interference and/or the service quality.

The WTRU may be configured with a fixed discovery transmission rate. For example, the WTRU may be configured by the network with a given discovery transmission rate. The WTRU may receive the configuration via dedicated signaling (e.g., via RRC, NAS, from the ProSE server, and/or the like). The WTRU may receive the configuration via the broadcast channel (e.g., via one or more SIBs). The configuration may identify the resource pool(s), RSRP range(s) and/or RSRP threshold(s).

The WTRU may be configured with a discovery transmission rate, for example, which may be parameterized using one or more of the following. The WTRU may be configured with an average rate expressed in a number of discovery transmissions per seconds. The WTRU may determine how many discovery transmissions to perform in one or more (e.g., a series of) discovery occasions to achieve the rate. The WTRU may be configured to transmit the discovery signals at regular intervals to achieve the rate. The WTRU may be configured with a number of discovery transmissions for a specific number of discovery occasions and/or specific time interval. For example, the WTRU may be configured to transmit N transmit discovery signals over N discovery occasions. The WTRU may be configured to transmit N transmit discovery signal during a time interval, for example, which may be specified in a number of frames (e.g., Nframes) and/or absolute time (e.g., seconds).

The WTRU may be configured to repeat the discovery signal payload during a discovery occasion, for example, when the rate permits. This may happen, for example, when the rate is such that the WTRU may transmit more than one discovery signal in one discovery occasion.

The configured discovery transmission rate may be applicable to one or more (e.g., all) discovery processes. The WTRU may be configured with a discovery transmission rate specific to a (e.g., each) discovery process.

The WTRU may determine the discovery transmission rate autonomously. The WTRU may base its discovery transmission rate on measurements of discovery resources. The WTRU may be configured with a minimum discovery transmission rate and/or a maximum transmission rate. The WTRU may be configured to measure the resource utilization and update the current transmission rate (e.g., current_discovery_rate) after a given measurement period.

The WTRU may initialize the current_discovery_rate to a value (e.g., predefined value). The WTRU may initializes the current_discovery_rate to the minimum discovery transmission rate configured. The WTRU may reset, re-initialize, and/or set to zero the current_discovery_rate, for example, when one or more of the following occurs. The WTRU may reset, re-initialize, and/or set to zero the current_discovery_rate when the WTRU has not transmitted a discovery signal for a configured duration of time. The WTRU may reset, re-initialize, and/or set to zero the current_discovery_rate when the WTRU receives a signal from the network. For example, the signal may be a signal indicating a change of resources for discovery (e.g., in which case the WTRU may re-initialize the current_discovery_rate) and/or a signal indicating the WTRU to set its current_discovery_rate to 0 (e.g., for a predefined amount of time after which the WTRU may be configured to re-initialize the current_discovery_rate). The WTRU may reset, re-initialize, and/or set to zero the current_discovery_rate when the WTRU determines (e.g., measures) that the discovery resources utilization level is above and/or below a threshold, for example, for a configured amount of time.

There may be one or more triggers for the WTRU to increase and/or decrease the current_discovery_rate. The WTRU may increase the value of the current_discovery_rate by an amount when the WTRU determines that the resource utilization is below a threshold, for example, for a period of time.

The WTRU may increase the discovery transmission rate by an amount (e.g., the WTRU may double the discovery transmission rate). The WTRU may be configured to not exceed the maximum rate configured.

The WTRU may decrease the discovery transmission rate by an amount. For example, the WTRU may decrease the discovery transmission rate by an amount once for a period of time (e.g., every period of time) during which the WTRU determines that the resource utilization is above and/or below a threshold, for example, for a period of time. The WTRU may decrease the discovery transmission rate by an amount based on the activity state associated to one or more of its discovery processes, for example, when the WTRU determines that it has not performed a discovery transmission during an amount of time. The WTRU may decrease the discovery transmission rate by an amount based on network signaling. For example, the WTRU may decrease the discovery transmission rate by an amount when the WTRU receives network signaling via dedicated signaling (e.g., using a DCI on (e)PDCCH masked by C-RNTI, by another configured RNTI, by L2 MAC signaling using a MAC Control Element, and/or the like). For example, the WTRU may decrease the discovery transmission rate by an amount when the WTRU may receive network signaling via the broadcast channel (e.g., via one or more the SIBs).

The WTRU may halve the discovery transmission rate. The WTRU may not decrease the rate below the minimum value configured.

The WTRU may determine the discovery resource usage based on the energy level on discovery resources. For example, the WTRU may measure the energy level on the discovery resources (e.g., when not transmitting) and compare it to a threshold. The WTRU may determine the discovery resource usage based on the number of successful discoveries. For example, the WTRU may count the number of successful discoveries and compare it to a threshold. The WTRU may determine the discovery resource usage based on one or more SIBs. For example, the WTRU may monitor one or more SIBs for indication of resource utilization. The WTRU may read the resource utilization from the one or more SIBs.

The WTRU may determine the resource utilization based on an indication by the network, for example, signaled via one or more SIBs. For example, the WTRU may monitor the one or more SIBs for a discovery signal resource utilization overload indicator. The WTRU may increase and/or decrease its discovery transmission rate (e.g., as described herein), for example, based on the value of the overload indicator.

The WTRU may determine that one or more discovery resources are dedicated (e.g., associated to different discovery processes by the network) while one or more discovery resources are shared. The WTRU may consider (e.g., only consider) the one or more discovery resources that are shared in its determination of resource usage level. The WTRU may apply the resulting transmission rate to processes associated with shared resources (e.g., only to processes associated with shared resources).

Interference mitigation via resource randomization may be provided. The transmitting WTRU may select the actual transmission occasions, for example, from a set of allowed discovery occasions, for example, to randomize the system interference.

WTRU may randomly select a resource (e.g., the set of subframes) over which to attempt D2D communication (e.g., discovery transmission). The transmitting WTRU may determine the set of subframes over which a discovery signal may be transmitted. The WTRU may determine the number of subframes used for discovery signal transmission (e.g., Nreq) over a number of discovery subframes (e.g., Ndisc), for example, defined over a period of time (e.g., over a discovery occasion cycle) based on its configuration, for example, based on one or more of the following.

The WTRU may determine the number of subframes used for discovery signal transmission based on the number of discovery processes configured, the QoS and/or discovery transmission rate of a (e.g., each) discovery process, the maximum and/or minimum discovery transmission rate configured and/or allowed per transmitting WTRU, and/or the minimum number of subframes used by the WTRU to meet its required QoS across the configured discovery processes.

The WTRU may select (e.g., randomly) Nreq subframes (e.g., a resource) over the total number of subframes (e.g., from a plurality of resources), for example, during a period (e.g., Ndisc subframes), for example to perform and/or attempt D2D communication (e.g., discovery transmission).

The WTRU may select the resource (e.g., subframe(s), PRB(s), etc.) using a (e.g., predefined) randomization function, for example, which may be initialized by a WTRU-specific value. This may ensure that no two WTRUs select the same set of resources over time. The WTRU may be configured with a pseudo-random sequence function initialized with a seed based on a WTRU-specific value signaled by the network and/or based on a WTRU-ID and/or part of a WTRU-ID (e.g., IMSI, T-IMSI, C-RNTI, IMEI, etc.).

The WTRU may re-initialize the randomization function at a regular interval, for example, every time the SFN wraps around and/or at another time instant.

Time delay restrictions may be provided. For example, the WTRU may be configured with a minimum delay and/or number of subframe between two allowed discovery transmissions. This may be used to exploit time diversity of the channel. When selecting (e.g., randomly) Nreq subframes (e.g., a resource) over the total number of subframes (e.g., from a plurality of resources) during a period (e.g., Ndisc subframes) to perform and/or attempt discovery transmission, the WTRU may ensure that no two selected subframes violate the minimum delay requirement. This may be performed, for example, by discarding invalid configurations when they occur and/or re-attempting selection until it meets the requirements.

The WTRU may selects one or more (e.g., a set) of subframes over which to attempt discovery transmission, for example, based on predefined hopping pattern. The WTRU may be preconfigured with one or more set of subframe hopping patterns. A (e.g., each) hopping pattern may define a set of subframes over which the transmitting WTRU may transmit a discovery signal, for example, over a period of time (e.g. over a discovery occasion cycle).

The WTRU may determine the number of subframes used for a discovery signal transmission (e.g., Nreq) over a number of discovery subframes (e.g., Ndisc), for example, as described herein. The WTRU may select the family of hopping pattern for which the hopping pattern (e.g., every hopping pattern) allows for Nreq discovery subframes transmission, for example, based on the value of Nreq. The WTRU may select one or more of the hopping patterns from that family, for example, based on a random function. For example, the WTRU may select the hopping pattern using an index generated by a pseudo-random function. The pseudo-random function may be initialized with a seed derived, for example, as described herein.

Although features and elements are described with reference to LTE (e.g., LTE-A) and LTE terminology, the features and elements described herein may be application to other wired and wireless communication protocols, for example, HSPA, HSPA+, WCDMA, CDMA2000, GSM, WLAN, and/or the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit receive unit (WTRU) comprising:
a processor configured to:
receive a measurement configuration from a network, the measurement configuration indicating a threshold and a resource pool on which to perform measurements, wherein the resource pool is configured for direct communications between multiple WTRUs, and the resource pool comprises a plurality of resources;
measure respective energy levels of the resources in the resource pool;
determine a ratio of the resources in the resource pool that have a measured energy level above the threshold for a duration of time; and
send a report to the network indicating the ratio.

2. The WTRU of claim 1, wherein the resource pool comprises sidelink resources.

3. The WTRU of claim 1, wherein the resource pool comprises physical sidelink control channel (PSCCH) resources.

4. The WTRU of claim 1, wherein the resource pool comprises resources used for device-to-device (D2D) discovery.

5. The WTRU of claim 1, wherein the ratio indicates a percentage of the resources of the resource pool that is occupied.

6. The WTRU of claim 1, wherein, when the ratio exceeds a specific level, the report indicates that the resources in the resource pool are insufficient for the WTRU to meet a target QoS or discovery transmission rate.

7. The WTRU of claim 1, wherein the report comprises an indication of a number of subframes during which the respective measured energy levels of the resources in the resource pool are above the threshold.

8. The WTRU of claim 1, wherein the measurement configuration is received via radio resource control (RRC) signaling.

9. A method comprising:
receiving a measurement configuration from a network, the measurement configuration indicating a threshold and a resource pool on which to perform measurements, wherein the resource pool is configured for direction communications between multiple wireless transmit receive units (WTRUs), and the resource pool comprises a plurality of resources;
measure respective energy levels of the resources in the resource pool;
determining a ratio of the resources in the resource pool that have a measured energy level above the threshold for a duration of time; and
sending a report to the network indicating the ratio.

10. The method of claim 9, wherein the resource pool comprises sidelink resources.

11. The method of claim 9, wherein the resource pool comprises physical sidelink control channel (PSCCH) resources.

12. The method of claim 9, wherein the resource pool comprises resources used for device-to-device (D2D) discovery.

13. The method of claim 9, wherein the ratio indicates a percentage of the resources of the resource pool that is occupied.

14. The method of claim 9, wherein, when the ratio exceeds a specific level, the report indicates that the resources in the resource pool are insufficient to meet a target QoS or discovery transmission rate.

15. The method of claim 9, wherein the report comprises an indication of a number of subframes during which the respective measured energy levels of the resources in the resource pool are above the threshold.

16. The method of claim 9, wherein the measurement configuration is received via radio resource control (RRC) signaling.

* * * * *